US012706097B2

(12) United States Patent
Venkatraman et al.

(10) Patent No.: US 12,706,097 B2
(45) Date of Patent: Aug. 11, 2026

(54) SYNCHRONIZATION OF REMOTE CONTEXT DATA

(71) Applicant: Apple Inc., Cupertino, CA (US)

(72) Inventors: Kartik R. Venkatraman, Santa Clara, CA (US); Brian E. Korver, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 18/912,435

(22) Filed: Oct. 10, 2024

(65) Prior Publication Data

US 2025/0037715 A1 Jan. 30, 2025

Related U.S. Application Data

(62) Division of application No. 16/882,127, filed on May 22, 2020, now Pat. No. 12,142,265.

(60) Provisional application No. 62/855,969, filed on Jun. 1, 2019.

(51) Int. Cl.

| | |
|---|---|
| ***G10L 15/22*** | (2006.01) |
| ***G10L 15/26*** | (2006.01) |
| ***G10L 15/30*** | (2013.01) |
| ***G10L 17/22*** | (2013.01) |
| ***H04L 41/0681*** | (2022.01) |
| ***H04L 67/1095*** | (2022.01) |
| ***H04L 67/50*** | (2022.01) |

(52) U.S. Cl.

CPC .............. *G10L 15/22* (2013.01); *G10L 15/26* (2013.01); *G10L 15/30* (2013.01); *G10L 17/22* (2013.01); *H04L 41/0681* (2013.01); *H04L 67/1095* (2013.01); *H04L 67/535* (2022.05); *G10L 2015/223* (2013.01)

(58) Field of Classification Search

CPC ............. H04L 41/0681; H04L 67/1095; H04L 67/535; G10L 15/22; G10L 15/26; G10L 15/30; G10L 17/22; G10L 2015/223

See application file for complete search history.

(56) References Cited

U.S. PATENT DOCUMENTS 10,334,025 B2 * 6/2019 Calo ........................ H04L 67/51
11,337,209 B2 * 5/2022 Chang ............... H04W 56/0005
2005/0254520 A1 * 11/2005 Jung ........................ G01D 9/00 370/469
2009/0282156 A1 * 11/2009 Jung ..................... H04L 67/125 709/228
2012/0197856 A1 * 8/2012 Banka ................. H04L 67/2885 707/706

(Continued)

OTHER PUBLICATIONS

Madden, et al., "The Design of an Acquisitional Query Processor for Sensor Networks," June 200, Sigmod, 12 pages.

*Primary Examiner* — Oleg Survillo
(74) *Attorney, Agent, or Firm* — BAKERHOSTETLER

(57) ABSTRACT

Embodiments described herein provide for a multi-device context store in which context attributes of multiple devices can be synchronized. A first device can transmit a predicate to a second device, where the predicate includes a condition associated with an attribute of a multi-device context store. Upon the occurrence of the condition at the second device, a notification and/or context update can be sent by the second device to the first device. The predicate can also include a code block to be executed upon the occurrence of the condition.

20 Claims, 16 Drawing Sheets

(56) References Cited

U.S. PATENT DOCUMENTS

| | | | | |
|---|---|---|---|---|
| 2012/0220232 | A1* | 8/2012 | Okano | H04W 4/50 455/41.2 |
| 2013/0262434 | A1* | 10/2013 | Dong | G06F 16/24547 707/715 |
| 2014/0032955 | A1* | 1/2014 | Boelter | G06F 1/3206 713/323 |
| 2015/0189661 | A1* | 7/2015 | Lindner | H04M 15/58 455/456.2 |
| 2016/0147585 | A1* | 5/2016 | Konig | G06F 11/0751 714/37 |
| 2017/0025122 | A1* | 1/2017 | Choi | H04M 1/72454 |
| 2017/0116383 | A1* | 4/2017 | Ziavras | G16H 40/67 |
| 2017/0308602 | A1* | 10/2017 | Raghunathan | G06F 16/27 |
| 2019/0053178 | A1* | 2/2019 | Merwaday | H04W 4/46 |
| 2021/0081854 | A1* | 3/2021 | Valverde, Jr. | G06F 16/9537 |

* cited by examiner

200

| | Local Context DB 114 | |
|---|---|---|
| | Attribute | Value |
| 202 | BatteryLevel | 80% |
| 204 | ExtPower | False |
| 206 | Wi-FI | True |
| 208 | CurrentLocation | Home |
| 210 | ScreenLit | False |
| 212 | LastUserInput | 20190601:0615 |
| 214 | Foreground Apps | [Foreground App List] |
| 216 | Active Events | [Active Event List] |

| | Remote Context DB 116 | |
|---|---|---|
| | Attribute | Value |
| 230 | BatteryLevel | 100% |
| 232 | ExtPower | True |
| 234 | Wi-FI | True |
| 236 | CurrentLocation | Office |
| 238 | ScreenLit | True |
| 240 | LastUserInput | 20190601:1340 |
| 242 | Foreground Apps | [Foreground App List] |
| 244 | Active Events | [Active Event List] |
| 246 | WearableConn | True |
| 248 | HeartRate | 77 |

*FIG. 2*

Construct a predicate on a requesting device
702

Transmit the predicate to a context store daemon on the requesting device
703

Transmit predicate to remote context store of a remote device
704

Receive context store changes from the remote device in a context store update
705

Store changes in remote context database of requesting device
706

Evaluate changes to context store in relation to one or more attributes of a multi-device context
707

Trigger a code block or callback associated with the one or more attributes
708

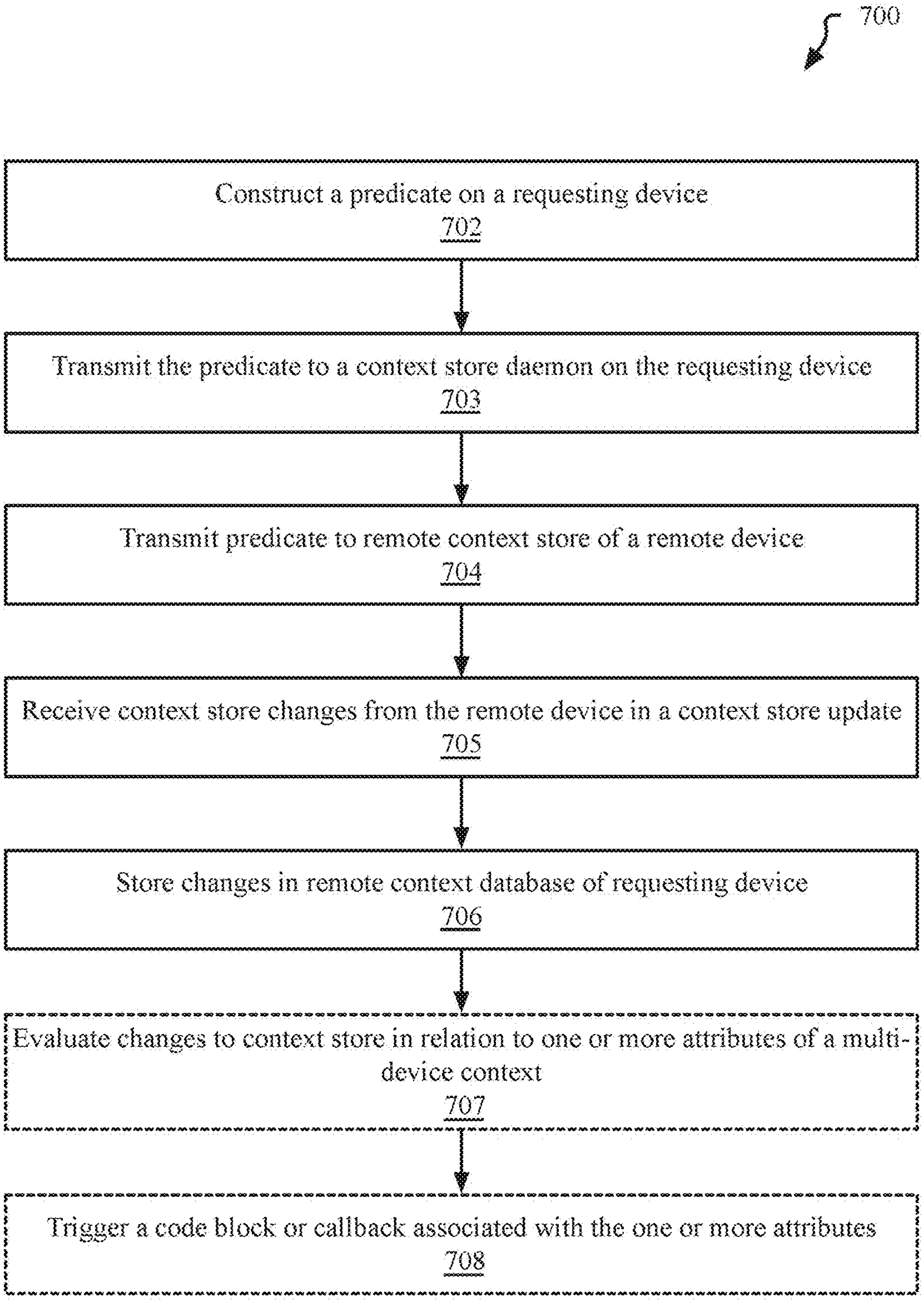

*FIG. 7A*

Receive a predicate from a remote device
712

Store a code block of the predicate in a code block database
713

Create a registration for the predicate that references the predicate condition and code block to conditionally execute
714

Monitor multi-device context for changes
715

Detect a change to a context in a context database of the multi-device context
716

Evaluate the context change relative to the registration for the predicate
717

Trigger the code block in the code block database when the change matches the conditional for the predicate
718

Synchronize local context DB with remote context DB on remote device
719

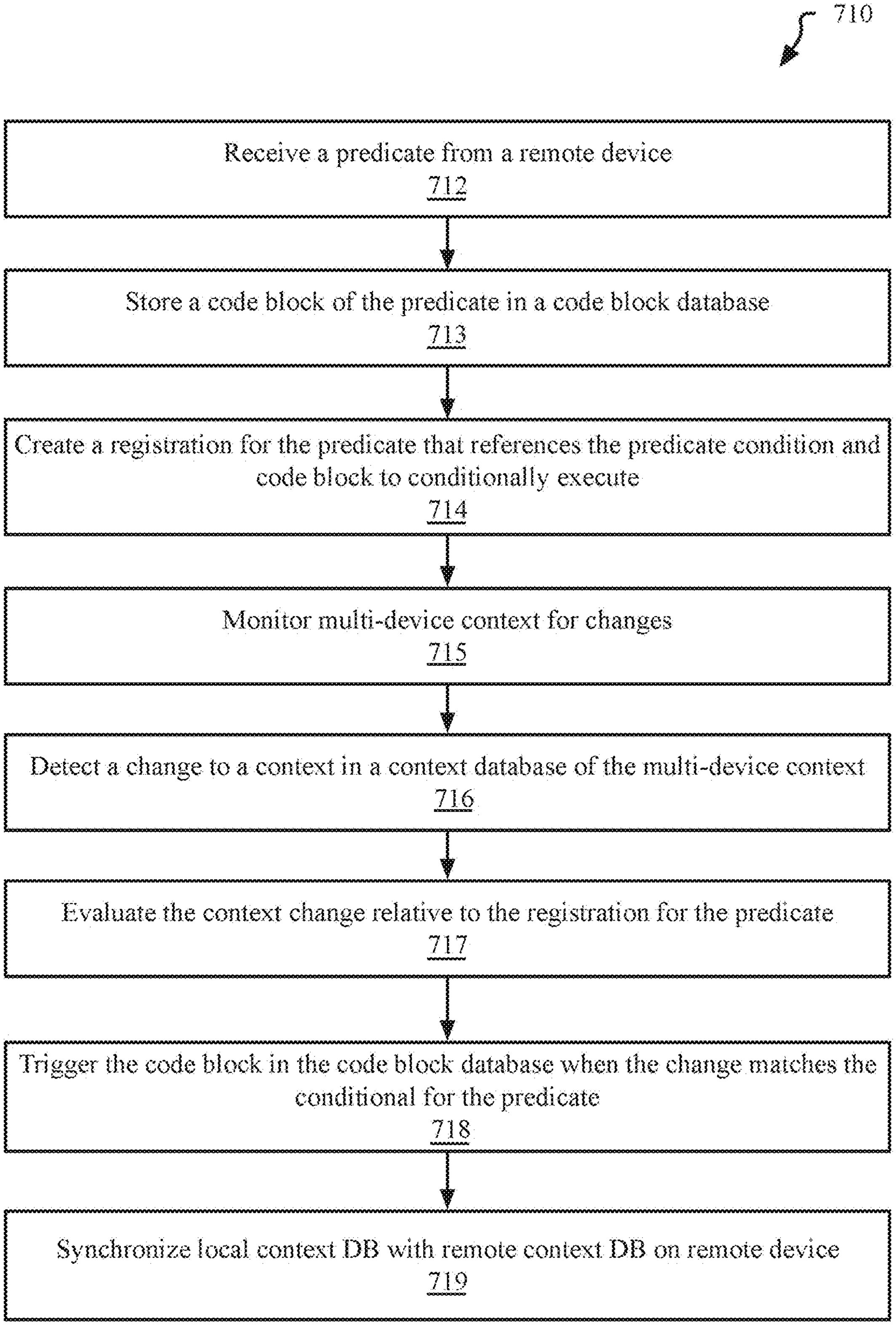

*FIG. 7B*

Receive a predicate from a remote device
862

Create registration for the predicate
863

Set application processor to a low power state
864

Detect a context change in a local context DB that is relevant to the predicate while an application processor is in a low power state
865

Detect nearby presence of the remote device via a low-power processor
866

Update payload in a wireless radio advertisement to indicate a change in local context DB associated with registration from the remote device without waking the application processor
867

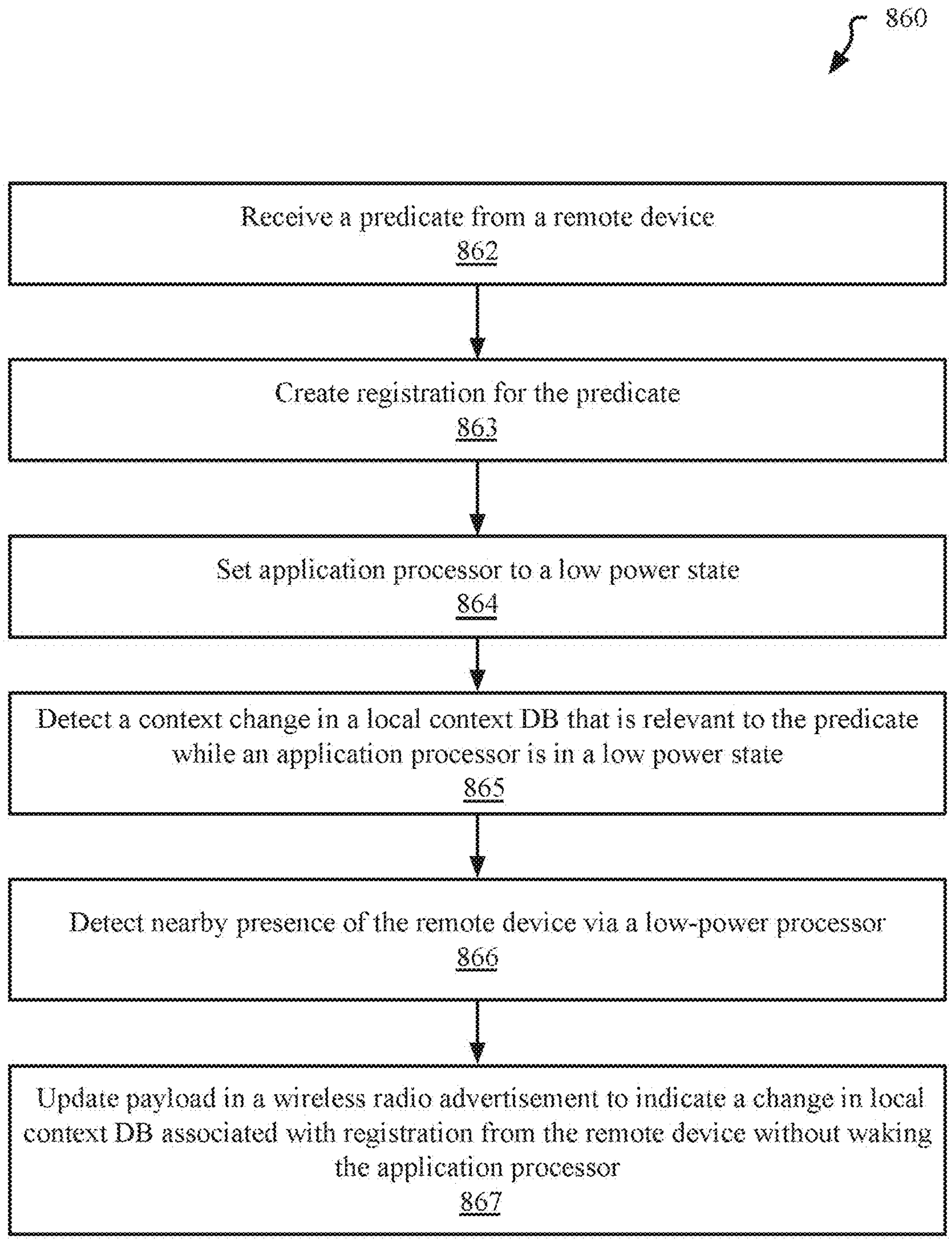

*FIG. 8B*

SYNCHRONIZATION OF REMOTE CONTEXT DATA

CROSS-REFERENCE

This application is a divisional of U.S. patent application Ser. No. 16/882,127, entitled "Synchronization of Remote Context Data," filed on May 22, 2020, which claims the benefit of priority to U.S. Provisional Patent Application No. 62/855,969 filed Jun. 1, 2019, the disclosure of each of which is hereby incorporated herein in its entirety.

FIELD

Embodiments described herein relate generally to a system and method of synchronization of context data between networked electronic devices and scheduling tasks based on remote context.

BACKGROUND OF THE DESCRIPTION

Computing devices may be configured to collect information about user activities in order to predict or anticipate behaviors and/or computing needs of a user. Such devices can attempt to predict or anticipate a user's behavior based on the data collected by a single device. For example, based on historical context data, a device can attempt to predict a future context state. However, if a user regularly makes use of multiple computing devices, the data collected by any one device of the user may provide an incomplete picture of the user's behavior and/or computing needs.

SUMMARY OF THE DESCRIPTION

Embodiments described herein provide a system and method of synchronization of context data between networked electronic devices and scheduling tasks based on remote context. A first device can transmit a predicate to a second device, where the predicate includes a condition associated with an attribute of a multi-device context store. Upon the occurrence of the condition at the second device, a notification and/or context update can be sent by the second device to the first device. The predicate can also include a code block to be executed upon the occurrence of the condition.

One embodiment provides for a non-transitory machine-readable medium storing instructions to cause one or more processors to perform operations comprising constructing a predicate on a first electronic device, wherein the predicate includes a condition associated with an attribute of a multi-device context store, transmitting the predicate to a second electronic device, receiving a notice from the second electronic device that the condition was satisfied, and performing an action on the first electronic device in response to the notice.

One embodiment provides for a method comprising, on an electronic device including one or more processors, receiving a predicate from a remote device, wherein the predicate includes a predicate condition associated with an attribute of a multi-device context store, storing a code block of the predicate in a code block database creating a registration for the predicate that references the predicate condition and code block to conditionally execute upon occurrence of the predicate condition, monitoring the multi-device context store for a change to an attribute, in response to detecting a change to the attribute, evaluating the change relative to the registration for the predicate, and executing a code block when the predicate condition evaluates to true based on the change to the attribute.

Using the techniques described above, a data processing system can be configured that includes a camera device, a network interface, memory to store instructions, and one or more processors to execute the instructions. The instructions cause the one or more processors to begin upload of a set of photos via the network interface, the set of photos captured via the camera device, wherein the set of photos are to be uploaded to a remote photo library, send a predicate to a remote device, wherein the predicate includes a condition to trigger when a photo application with access to the remote photo library is launched or becomes a foreground application, pause the upload of the set of photos before completion of the upload, receive a notice from the remote device that the predicate has been triggered, and resume the upload of the set of photos in response to the notice.

Using the techniques described above, an electronic device can be configured that includes memory to store instructions and one or more processors to execute the instructions. The instructions cause the one or more processors to begin playback of a media item, send a predicate to a mobile electronic device configured to receive incoming calls, the predicate to trigger upon receipt of an incoming call at the mobile electronic device, receive a notice from the mobile electronic device of an incoming call at the mobile electronic device, and pause playback of the media item in response to the notice.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which:

FIG. 2 illustrates example context databases;

FIG. 7A-7C illustrates methods of conditionally performing local or remote actions based on a synchronized multi-device context;

FIG. 8A-8B illustrates operations and methods to synchronize multi-device context data via one of multiple communication channels;

DETAILED DESCRIPTION

Embodiments described herein provide techniques to enable synchronization of remote context data between devices and enable the conditional execution of task or program code based on an attribute of a context data on a device Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2018 Apple Inc.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

Multi-Device Context Store

Figure 1:
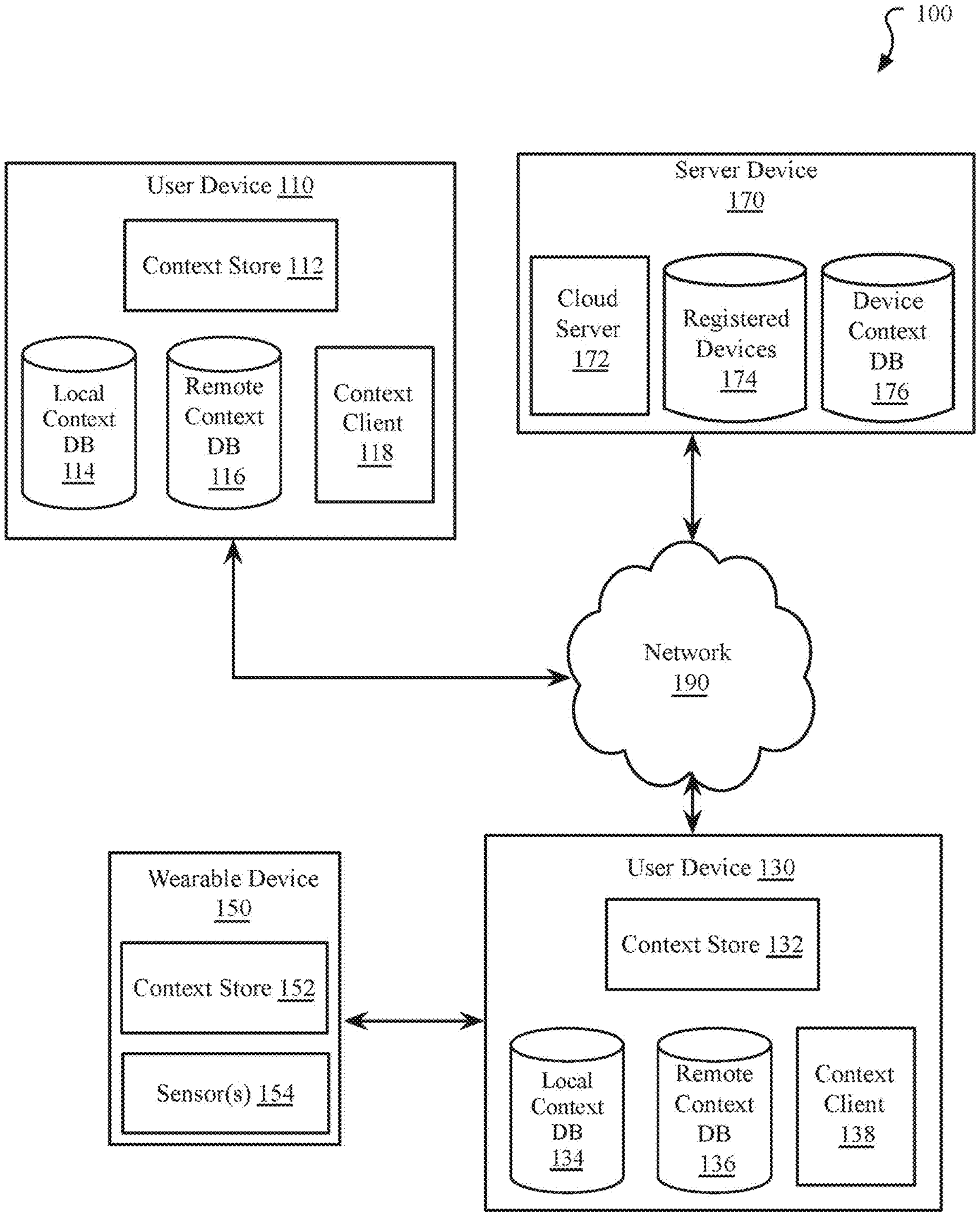
FIG. 1 is a block diagram of an example system for providing a multi device context store.

FIG. 1 is a block diagram of a system 100 for providing a multi device context store. For example, system 100 can exchange context data (e.g., device context, application context, user context, etc.) between devices. Context clients can query the multi-device context store so that the context clients can determine a user context based on the multi-device context data. Context clients can also specify predicates that indicate that one or more actions should be performed upon the occurrence of an event or context state within the multi-device context data. A predicate can specify a condition and one or more remote devices to which the condition applies. The predicate can also include a code block to execute upon the occurrence of the condition. Compound predicates that specify multiple conditions and/or code blocks are also supported.

Predicates can be classified as waking or non-waking predicates. In some implementations, updates and remote synchronization to the multi-device context store can be managed in part by a low-power processor. Some predicates can be classified by a system policy as waking predicates, such that the occurrence of the condition specified by the predicate can cause an application processor or high-performance processor to wake from a sleep state to execute the code block associated with the predicate. Other predicates can be classified by the system policy as non-waking predicates, such that the occurrence of the condition causes the code block associated with the predicate to be placed into a queue. Code blocks in the queue can then be executed when the application processor wakes from the sleep state due to the occurrence of other events. In one implementation, predicates can include a wake flag to indicate whether the predicate is a waking or non-waking. In such implementation, the wake flag may be honored only for a whitelist of predicates that is managed by the system policy.

System 100 can include user device 110. User device 110 can be a computing device such as a smartphone, tablet computer, laptop computer, desktop computer, or wearable device (e.g., smart watch, smart glasses, head mounted display, etc.). User device 110 can be one of many devices) associated with a user and/or user account. For example, user device 130 and wearable device 150 may also be associated with the user and/or user account. The user account may be an account associated with a vendor or service provider that provides various services to the user or to the user's devices. The user can have an account with a cloud service provider that provides systems and devices that synchronize data between multiple user devices. For example, a server device 170 can include a cloud server 172, which may be a cluster of virtual servers.

In some implementations, user device 110 can include context store 112. For example, context store 112 can be a process (e.g., daemon or background process) that collects context data from other processes running on user device 110. For example, context client 118 can submit context data (e.g., device state data, application state data, sensor data, location data, etc.) to context store 112. The context data can include user context, such as a location of the user (e.g., at home, at work, at school, etc.) and/or an activity performed by the user (e.g., running, reading, sleeping, using a device, etc.). The context data can also include device context, such as but not limited to device state, operating system state, application state, device sensor data, or the like. Examples of device context can include device display power state, the network connectivity state (e.g., Wi-Fi, Ethernet, etc.), cellular data connection status, device geographic location, accelerometer data indicating whether device is moving, etc. The context data can be submitted in the form of key-value (e.g., attribute-value) pairs. When context data is received by context store 112 from local context clients (e.g., local processes, applications, etc.), context store 112 can store the context data in local context database 114.

The user device 110 can also exchange context data with other user devices. For example, system 100 can include user device 130. User device 130 can be configured (e.g., hardware and/or software) similarly to user device 110 or can be configured differently. For example, user device 110 can be a tablet computer and user device 130 can be a smartphone. User device 110 can also be a laptop or desktop computer. User device 130 can include context store 132 and local context database 134, for example. As described above with reference to user device 110, context store 132 can receive context data (e.g., key-value pairs) from context client 138 running locally on user device 130 and store the context data in local context database 134. To get a more complete picture of the user's context, user device 110 and user device 130 can exchange context data. For example, context store 112 on user device 110 can send context data from local context database 114 to context store 132 on user device 130. Upon receiving the context data from user device 110, context store 132 can store the context data in remote context database 136. Similarly, context store 132 on user device 130 can send context data from local context database 134 to context store 112 on user device 110. Upon receiving the context data from user device 130, context store 112 can store the context data in remote context database 116.

To establish communication between user device 110 and user device 130, each user device can obtain user device information from cloud server 172 that identifies each of the devices associated with the same user account. For example, user device 110 and user device 130 can be associated with the same user account with cloud server 172. Cloud server 172 can, for example, maintain a registered devices database 174 of devices registered to the user's account with cloud server 172. Registered devices database 174 can include, for example, records for each registered device that includes a user account identifier and a device identifier. The registered device information can be shared with the various devices associated with the user's account so that the devices can communicate with each other and exchange context data.

In some implementations, user device 110 and user device 130 can exchange context data through network 190. For example, network 190 can be a wide area network, local area network, cellular network, Wi-Fi network, or adhoc network between devices. For example, network 190 can be implemented through the internet using standard internet protocols. Network 190 can also be a direct device to device network using peer-to-peer communications technologies like near field communication (NFC), Bluetooth, Bluetooth LE, or peer-to-peer Wi-Fi, for example.

Context data can be exchanged between user device 110 and user device 130 using a broadcast mechanism. For example, establishing a communication channel with user device 130 and sending the context data directly to user device 130, user device 110 can broadcast context data using a Bluetooth advertising packet. Each user device within range of the Bluetooth broadcast can receive the context data and update its remote context database accordingly. For example, user device 110 can broadcast a Bluetooth LE advertisement packet that identifies user device 110 and has a payload encoded with context data from local context database 114. User device 130 can listen for and receive the advertisement packet, determine that the advertisement is from a user device associated with the same user account as user device 130 (e.g., as determined based on the registered device data received from cloud server 172), and decode the context data for user device 110 from the advertisement payload. User device 130 can then store the context data from user device 110 in corresponding remote context database 136 on user device 130.

Similarly, context data can be broadcast through cloud server 172 on server device 170. For example, user device 130 can broadcast context data through cloud server 172 instead of directing the context data to user device 110. User device 130 can send a context update message to cloud server 172 that includes context data updates from local context database 134. The context update message can, for example, identify the sending device and include a list of key-value pairs representing the context updates. Upon receipt of the context update message, cloud server 172 can update device context database 176 with the updated context data and forward the updated context data received from user device 130 to the other user devices (e.g., user device 110) associated with the same user account. Thus, user device 130 does not need to know which devices are associated with the user account or how to reach each user device associated with the user account. Additionally, since the communication with server device 170 can be performed through the internet, user device 130 does not have to be near user device 110 in order to share context updates with user device 110 as is the case with the near field communication (NFC) or Bluetooth communication mechanisms.

In some implementations, user device 110 and user device 130 can exchange context data according to various timing mechanisms or in response to various triggers. For example, context store 112 on user device 110 can be configured to send context data updates from local context database 114 to context store 132 on user device 130 periodically (e.g., according to a configured time interval). Context store 112 on user device 110 can be configured to send context data updates from local context database 114 in response to detecting a change or update in local context database 114. For example, in response to receiving an updated or changed value for a corresponding attribute, context store 112 can broadcast the attribute value change to other user devices, as described above. In some implementations, user device 110 can send context data updates for specific context data that has been requested by other devices, as described further below.

In some implementations, a user device can serve as a context reporting proxy for other user devices. For example, user device 130 can serve as a context reporting proxy for wearable device 150. Wearable device 150 can, for example, be a smart watch that is connected to user device 130 (e.g., a smartphone). In some implementations, wearable device 150 can depend on user device 130 for some functions. For example, user device 130 may receive some communications (e.g., telephone calls, instant messages, text messages, etc.) and send notifications to wearable device 150 so that wearable device 150 can present the notifications to the user. Wearable device 150 may not have a cellular data connection and may rely on the cellular data or network data connection provided by user device 130. In other implementations, wearable device 150 may have a cellular or Wi-Fi data connection and is capable independent communication without reliance upon user device 130.

In some implementations, wearable device 150 can have the same or similar features as user device 110 and/or user device 130. On the other hand, wearable device 150 may include features, such as one or more sensor(s) 154 (e.g., a heart rate sensor, etc.), that user device 130 does not have. In one implementation, wearable device 150 can provide sensor data from sensor(s) 154 and/or other device context information specific to wearable device 150 to user device 130 so that user device 130 can use the sensor data and/or context data on user device 130. When user device 130 receives the sensor data and/or context data from wearable device 150, user device 130 can store the sensor data and/or context data (e.g., sensor data is context data) in local context database 134 as if the context data for wearable device 150 is context data for user device 130. For example, user device 130 can store context data in local context database 134 that indicates that user device 130 is connected to wearable device 150 (e.g., key: value=wearableConnected: true) and context data that indicates a value or state associated with sensor(s) 154 (e.g., key: value=heartrate: 77).

Where the context data for wearable device 150 is stored in local context database 134, user device 130 can share the context data in local context database 134 with other user devices (e.g., user device 110) as described above. Thus, user device 110 can use the context data associated with wearable device 150 to make decisions or provide various features even though user device 110 is not directly connected to (e.g., paired with) wearable device 150.

In one implementation, wearable device 150 can include a context store 152 that is independent of, but synchronized with context store 132 of user device 130. Context store 152 can have associated local and remote context databases in wearable device 150. Alternatively, context store 152 can be configured to use local context database 134 and remote context database 136 of user device 130. Where wearable device 150 stores its own local and remote context databases, the wearable device can synchronize context data with user device 110 independently of user device 130. For example, wearable device 150 can have an independent connection to server device 170 and use that connection to synchronize context data with user device 110. Independent context synchronization performed by wearable device 150 can occur at a lower rate than that performed by user device 110 or user device 130. In one implementation, wearable device 150 will perform independent context synchronization only when out of range or otherwise not in direct communication with user device 130.

In one implementation, wearable device 150 can perform actions based on remote context data received from user device 110 and/or user device 130. For example, wearable device 150 can be a smart watch that is has a watch face that uses contextual triggers to select from a set of interface elements to display. The contextual triggers can be performed based on attributes the interface elements can include contextual notices such as upcoming calendar events or notifications received from applications on wearable device 150. The interface elements can also be selected based on remote context reported to context store 152. In one example, a remote context attribute can be a Bluetooth connectivity status for user device 130. When the context store 152 receives a remote context update that indicates that user device 130 has connected via Bluetooth to a vehicle infotainment system, the wearable device 150 can update the interface elements that are displayed on the watch face to an element that is associated with driving or vehicle-based activity.

FIG. 2 illustrates example context databases 200. For example, local context database 114 and remote context database 116 can store context data as attribute-value pairs (e.g., key-value pairs) of data. Local context database 114 can store context data reported or submitted by local processes (e.g., applications, operating system, software utilities, hardware drivers, sensors, etc.) on user device 110. For example, a power monitoring process can submit an "80%" value for a "BatteryLevel" attribute to context store 112 on user device 110 and context store 112 can save the attribute-value pair as entry 202 in local context database 114. Similarly, the power monitoring process can determine that user device 110 is not connected to an external power source (e.g., the device is not charging and running on battery power) and send a "false" value for the "ExtPower" attribute indicating that user device 110 is not connected to an external power source and context store 112 can store the attribute-value pair as entry 204 in local context database 114.

User device 110 can include other processes that report context information to context store 112. For example, user device 110 can include a process that monitors and reports Wi-Fi connection state information (e.g., entry 206). User device 110 can include a process that monitors and reports the current location of user device 110 (e.g., entry 208). User device 110 can include a process that monitors and reports whether the device's screen is lit (e.g., entry 210). User device 110 can include a process that monitors and reports a timestamp corresponding to when the last user input was received (e.g., entry 212). The context data in local context database 114 can be reported by one or multiple processes. For example, the "LastUserInput" attribute of entry 212 can be reported by a single process that monitors all user input to user device 110 or by multiple different processes (e.g., applications) used by the user as the user interacts with user device 110. When context store 112 receives the attribute-value pairs of context data from local processes, context store 112 can store the attribute value pairs in local context database 114, as described above.

In one implementation, an attribute in the local context database 114 can also include a chain of values. For example, a foreground apps attribute (e.g., entry 214) can have a value that includes a chain of identifiers for foreground applications. An active events attribute (e.g., entry 216) can have a value that includes a chain of identifiers for selected application events. Selected application events can include events that indicate the beginning of a background application update or the beginning of an upload to or download from cloud storage.

In some implementations, user device 110 can include remote context database 116. For example, remote context database 116 can be structured similarly to local context database 114 in that remote context database 116 stores context data as attribute-value pairs of data. However, the context data in remote context database 116 reflects the device state and/or context data of a user device (e.g., user device 130) other than user device 110.

In some implementations, remote context database 116 can include entries for some of the same attributes as local context database 114. For example, even though the context data stored in remote context database 116 on user device 110 is received from user device 130, there may be some standard or core attributes that are reported on all user devices (e.g., user device 110, user device 130). These core attributes can include a battery level attribute (e.g., entry 202, entry 230), an external power attribute (e.g., entry 204, entry 232), Wi-Fi connection state information (e.g., entry 206, entry 234), a screen state attribute (e.g., entry 210, entry 238) and/or a last user input attribute (e.g., entry 212, entry 240). In one implementation, remote context database 116 can also include value chains, such as a foreground apps attribute (e.g., entry 242) and/or an active events attribute (e.g., entry 244). However, while some of the reported attributes may be similar between devices, the values will be different depending on the current state or context of the respective devices. For example, the reported values for battery level, external power connection, and/or last user input attributes may be different between devices based on the device's current configuration or status.

In some implementations, remote context database 116 can include attributes that are different than those in local context database 114. For example, even though remote context database 116 is stored on user device 110, remote context database 116 reflects the context of user device 130. In some implementations, user device 130 may have a different configuration (e.g., different applications, different hardware, different sensors, etc.) than user device 110. Thus, the context data reported to context store 132, shared with context store 112 and stored in remote context database 116 on user device 110 may be different than the context data (e.g., attribute-value pairs) stored in local context database 114. For example, user device 130 may be configured to pair with a wearable device (e.g., wearable device 150) and user device 110 may not. Thus, context store 132 on user device

130 may collect context data associated with wearable device 150. The wearable device context data can then be shared with context store 112 on user device 110 and stored in remote context database 116 as entry 246 (e.g., wearable connection status) and entry 248 (e.g., wearable sensor data).

In some implementations, user device 110 can determine a user context based on data from local context database 114 and remote context database 116. For example, individually, local context database 114 and remote context database 116 provide information reflecting the state or context of individual devices; however by analyzing the context data from both databases (e.g., context data from multiple devices), user device 110 can more accurately determine the current context of the user. For example, the user context can include a location of the user (e.g., at home, at work, at school, etc.) and/or an activity performed by the user (e.g., running, reading, sleeping, using a device, etc.), The user context can be determined and/or verified using device context data (e.g., device state data, sensor data, etc.) from multiple devices. For example, if user device 110 relied solely upon local context database 114 (e.g., local context data) to determine the location of the user, user device 110 would determine that the user is at home (e.g., entry 208). However, by analyzing the location (e.g., entries 208 and 236) and last user input (e.g., entries 212 and 240) data from both local context database 114 and remote context database 116, user device 110 can determine that the user is actually located at the office since the latest user input was received from user device 130 that is located at the user's office.

In some implementations, the context data in remote context database 116 can allow user device 110 to provide features or services that user device 110 cannot provide on its own. For example, remote context database 116 can include entry 244 that includes heartrate sensor data from wearable device 150. User device 110 may not have a heartrate sensor, but because user device 110 has received heartrate data from wearable device 150 through user device 130, user device 110 can now provide heartrate based services and/or information to the user. For example, user device 110 can track the user's heartrate, determine the user's fitness level, and/or make recommendations regarding the user's fitness routine. As another example, because user device 110 is receiving battery level (e.g., entry 230) and charging status (e.g., entry 232) data for user device 130, user device 110 can prompt (e.g., present a graphical element, audio warning, etc.) the user to plug in user device 130 when the battery level of user device 130 (as indicated in remote context database 116) drops below a threshold level (e.g., 20%) and user device 130 is not plugged in to an external power source (e.g., ExtPower=false). Thus, by sharing context data between devices, user device 110 can make a better determination of the user's context and/or provide features or services that would otherwise be unavailable on user device 110.

In some implementations, a predicate can be specified for an attribute and a device, along with a code block to conditionally execute based on the attribute. For example, user device 130 can specify a predicate for user device 110. The predicate can be based on the battery level (e.g., entry 202) and charging status (e.g., entry 204) in local context database 114 of user device 110. The predicate can be transmitted to user device 110 and registered with a scheduler on user device 110. The code block can be registered within a code block database on user device 110. Upon the occurrence of a condition within the local context database 114 (e.g., ExtPower=false, BatteryLevel less than 20%), the code block can be executed on user device 110. For example, the code block can place user device 110 in a low-power mode that reduces background activity to preserve battery.

In one implementation, when user device 130 sends the predicate to user device 110, user device 130 can register a local callback based on an entry in remote context database 136 to verify the execution of the predicate. For example, upon execution of the code block on user device 110 to place the device in the low-power mode, user device 110 can update local context database 114 with an entry that indicates that the device is in the low power state. For example, the active events attribute (e.g., entry 216) can be updated to include "low-power mode" as an active event. Entry 216 in local context database 114 can then be synced with an entry in remote context database 136 of user device 130 that indicates that user device 110 is in the low-power mode. This entry in remote context database 136 can be used to trigger a callback on user device 130 that verifies that the predicate was triggered correctly (e.g., that user device 110 entered the low-power mode). In some instances, user device 130 may then request user device 110 to un-register the predicate or register a different predicate.

Figure 3:
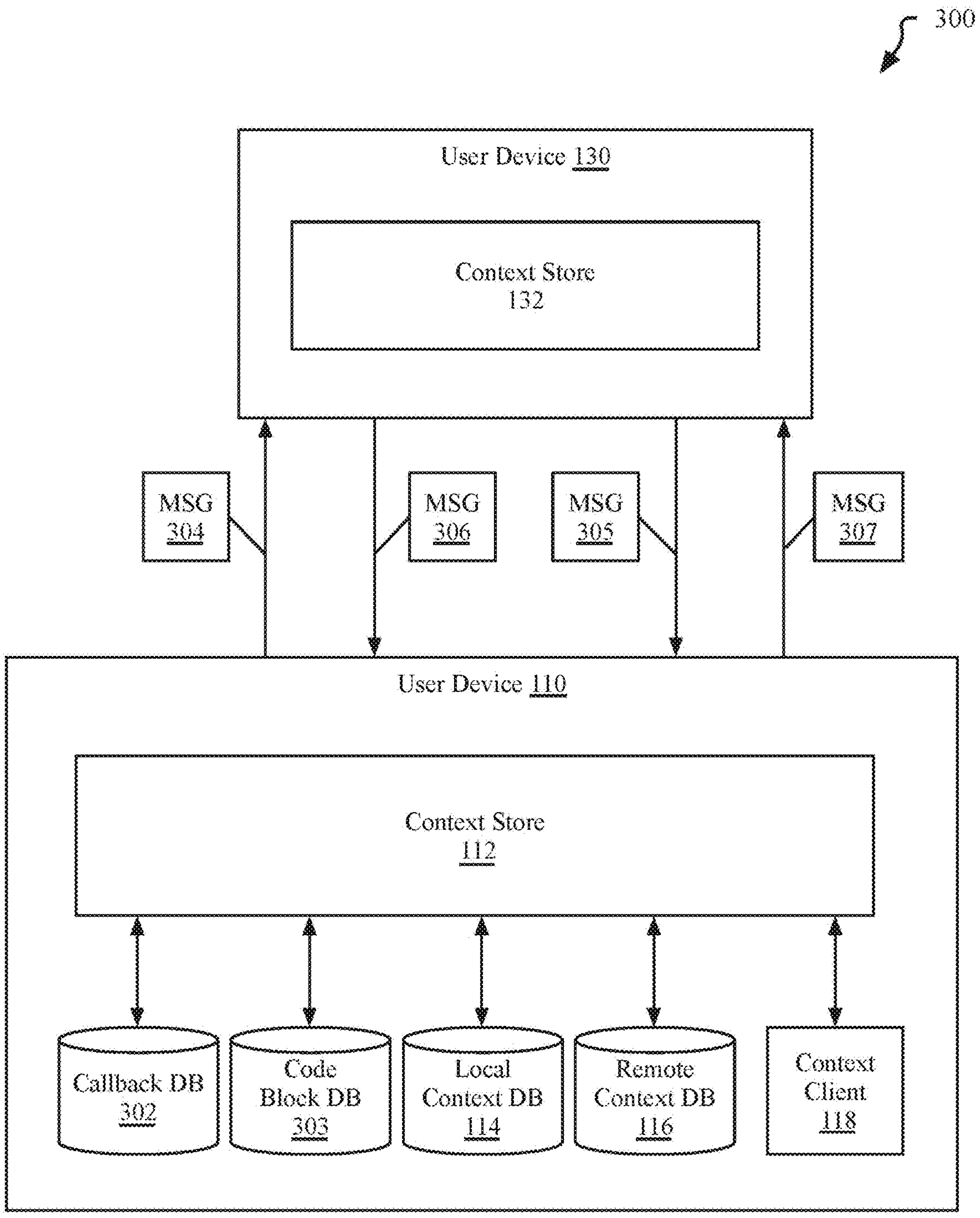
FIG. 3 is a block diagram of an example system for processing context client queries and predicates that are synched via a context store.

FIG. 3 is a block diagram of an example system 300 for processing context client queries and predicates that are synched via a context store. In some implementations, context client 118 can submit context queries to context store 112 on user device 110. For example, context client 118 can be a user application installed on user device 110. Context client 118 can be a process, function, utility, daemon, etc., of the operating system of user device 110. Context client 118 can be configured to submit to and/or request from context store 112 context information managed by context store 112.

In some implementations, context store 112 can receive a context query from context client 118. For example, context client 118 can be a process configured to remind a user to plug in and/or charge various user devices when the battery level of a user device drops below a threshold level. Context client 118 can submit a context query (e.g., request) to context store 112 requesting the current value of the "BatteryLevel" attribute. For example, the context query can include a list of attributes for which context client 118 is requesting values. Upon receipt of the query, context store 112 can obtain the current values for the attributes specified in the query from local context database 114 and/or remote context database 116 and return a mapping of device identifier to attribute-value pairs for the requested attributes that reflect the current values associated with the specified attributes on each device.

In some implementations, a context query can specify the scope of the query. For example, context client 118 may request context information for only the local device (e.g., user device 110). In response to receiving a context query that specifies a local device only scope, context store 112 can search local context database 114 for attributes corresponding to the attributes specified in the context query. Similarly, context client 118 may request context information for only a specified remote device (e.g., user device 130). In response to receiving a context query that specifies or identifies a remote device, context store 112 can search the remote context database (e.g., remote context database 116) corresponding to the identified remote device. In some situations, context client 118 can request context information for all devices. In response to receiving a context query that specifies all devices (e.g., the request can include a listing of device identifiers or just indicate all devices), context store 112 can search local context database 114 and all remote context databases (e.g., there can be one remote context database for each remote user device) for context data corresponding to the attributes specified in the context query. After the context data is obtained from local context database 114 and/or remote context database 116 according to the scope specified in the context query, context store 112 can send the context information (e.g., device ID—attribute-value mappings) to context client 118. Context client 118 can then use the context information to provide services and/or information to the user (e.g., inform the user about the battery charge state of various user devices).

In some implementations, context client 118 can register interest in receiving updates to context data. For example, context client 118 can submit a context query to context store 112 that indicates that context client 118 is interested in receiving status or context updates when context changes occur. To register interest in context updates, context client 118 can submit a context query that identifies attributes that the context client is interested in, specifies the scope of the query (e.g., local device, specified device, all devices, etc.), and indicates that the client is interested being called back when the values of the specified attributes change.

When context store 112 receives a context query that indicates that context client 118 is requesting context updates, context store 112 can obtain context data corresponding to the context query and send the context data to context client 118, as described above. However, when the context query indicates that context client 118 is requesting context updates (e.g., requesting a callback when an attribute value changes), context store 112 can store the context query in callback database 302 so that context store 112 can send context client 118 context updates when the attributes identified in the context query change values in the future.

In some implementations, a context query can specify attribute values that should trigger a callback to a context client. For example, context client 118 can generate a context query, as described above, that specifies that context client 118 is requesting to be called back when an update or change to an attribute value is detected. For example, context client 118 can submit a context query indicating that context store should notify (e.g., call back) context client 118 when the "BatteryLevel" attribute value for any user device drops below 20%. The context query in this case can include the battery level attribute (e.g., "BatteryLevel"), a relational operator (e.g., greater than, less than, equal to, etc.), the attribute value (e.g., 20%), the scope of the query (e.g., all devices), and a value indicating that context client 118 should receive context updates (e.g., callbacks) for future context changes for any user device where the battery level is less than 20%.

When context store 112 receives context data changes or updates (e.g., locally and/or from other user devices), context store 112 can search callback database 302 for callback queries that relate to the changed context data (e.g., attributes and/or attribute values). When context store 112 identifies a callback query that is related to a changed attribute or attribute value, context store 112 can notify the context client that submitted the context query (e.g., context client 118) that the current context corresponds to the criteria specified in the context query. Thus, context client 118 can be notified by context store 112 when any change to a specified attribute occurs or when a change occurs that meets the criteria specified in the context query.

In some implementations, a context query can cause a context data exchange between user devices. As described above, user device 110 and/or user device 130 can broadcast context data (e.g., attribute-value pairs) on a periodic basis. However, in some implementations, a user device (e.g., user device 130) can be selective about which attributes and attribute values are broadcast to other user devices. For example, user device 130 can be configured to periodically broadcast a configurable (e.g., core) set of attributes and attribute values (e.g., battery level, external power, location, etc.). For other attributes, user device 130 may broadcast attribute-value pairs when another device (e.g., user device 110) has expressed interest in those attribute-value pairs.

As described above, context store 112 can receive a context query from context client 118 indicating that context client 118 is requesting heartrate data from user device 130. In response to receiving the query, context store 112 can send a message 304 to context store 132 on user device 130 requesting context data corresponding to the heartrate attribute. Context store 132 can obtain the heartrate attribute value and send the heartrate attribute-value pair to context store 112 in message 306. Context store 112 can then update remote context database 116 with the heartrate attribute-value data and send the heartrate attribute-value pair to context client 118.

Similarly, context store 112 can receive a context query from context client 118 indicating that context client 118 is interested in receiving notifications when the heartrate attribute on user device 130 (e.g., and/or other devices) changes or meets a specified condition (e.g., heartrate is greater than a value, heartrate is less than a value). In response to receiving the query, context store 112 can send a message 304 to context store 132 on user device 130 indicating that context store 112 is requesting context data updates corresponding to the heartrate attribute. In response to receiving message 304, context store 132 can obtain the current heartrate attribute value and send the heartrate attribute-value pair to context store 112 in message 306. When context store 132 is notified (e.g., in message 304) that context store 112 is interested in receiving updates regarding the heartrate attribute, context store 132 can monitor for updates to the heartrate attribute and broadcast the heartrate updates when the heartrate attribute value changes or periodically, as described above. Upon receipt of the heartrate context data, context store 112 can update remote context database 116 with the heartrate attribute-value data and send the heartrate attribute-value pair to context client 118 or notify context client 118 when the heartrate attribute value meets the criteria or conditions specified in the context query. Thus, a user device can selectively broadcast a context data attribute (and not broadcast other attributes) based on whether another user device has expressed interest in the attribute.

In some implementations, the context data can be broadcast with other data that is regularly broadcast by the user device. For example, the context data can be added to other regularly broadcast state data such that the context data is "piggy-backed" on messages sent by other services on the user device. Thus, in some implementations, broadcasting the context data does not require the additional overhead and/or resources required to generate and broadcast a completely new message. In some implementations, a snapshot of context data can be sent periodically. The snapshot can include a context update as well as block of related context data. The snapshot can be piggy-backed on messages sent by other services or in conjunction with sending an individual context update. For example, in conjunction with sending a context update in response to a context query, updated context associated with other context updates of interest to a remote device. The snapshot can be cached and used by a device instead of sending a query through the context store each time the device is to perform an action that makes use of knowledge of a context attribute of a remote device.

In some implementations, a predicate can be transmitted from user device 130 to user device 110 in message 305. The predicate can include an activation condition or criteria as well as a code block to execute when the condition or criteria is satisfied. Activation of the predicate can be conditioned on an attribute in local context database 114 or remote context database 116 of the user device 110. The predicate can be conditioned on context attributes of user device 110 or on context attributes for remote devices that synchronize context with user device 110. A code block associated with the predicate received in message 305 can be stored in code block database 303. The condition of the predicate can be registered with context store 112 and, upon change of an attribute associated with the registration, context store 112 can evaluate any registered conditions that are associated with the attribute to determine if any of the code blocks in code block database 303 should be executed.

Upon the occurrence of the condition of a registered predicate, the associated code block can be executed on user device 110. The code block can have an effect on user device 110. For example, the code block can adjust a configuration state of user device 110. This adjustment of configuration state may cause an associated change to local context database 114 of user device 110, which may be synchronized with a remote context database on user device 130 via message 307. Message 307 can also include one or more messages to user device 130 that are transmitted by the code block of the triggered predicate. A predicate can also specify a condition based on an attribute in the remote context database 116. For example, user device 130 can transmit a predicate to user device 110 that include a condition that is based on an attribute in remote context database 116 that is associated with a third device.

Scheduling Activity Based on Multi-Device Context

Figure 4:
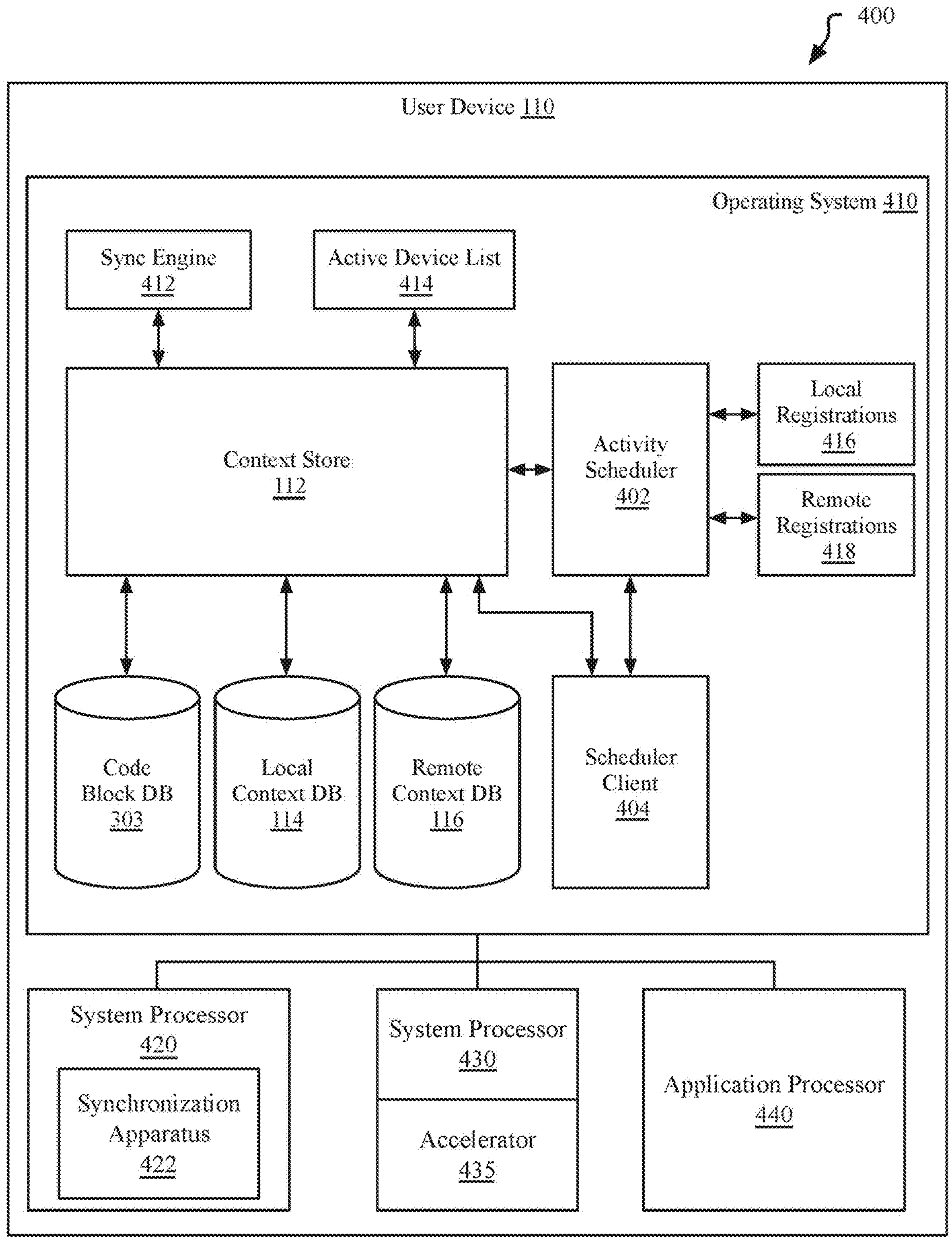
FIG. 4 is a block diagram of an example system for scheduling activities based on a multi device context.

FIG. 4 is a block diagram of an example system 400 for scheduling activities based on a multi device context. System 400 can determine when to initiate an activity (e.g., task, process, operation, etc.) on user device 110 based on a comparison between a predicate condition and a current context as determined based on context data collected by context store 112. The activity or task can be performed by the operating system 410 of user device 110 and/or an application or process that executes on the user device. The activity can be conditioned on an attribute in local context database 114 or remote context database 116. The activity can be performed based on a predicate code block that is stored in code block database 303.

Context store 112 can submit predicates to remote devices (e.g., user device 130) to perform context-conditioned execution of a code block on the remote device. Context store 112 can submit a predicate, for example, based on a request submitted by a context client (e.g., context client 118). The predicate can specify an activation condition and a set of devices to which the predicate is to be transmitted. The set of devices to which the predicate is to be transmitted can be selected from the set of devices that are registered to the same account as user device 110 (e.g., registered devices database 174 of server device 170 shown in FIG. 1). The selected devices can then be filtered via an active device list 414, which is a live list of devices that are active and in communication with cloud services (e.g., cloud server 172). Selected devices that are currently active can be transmitted via a synchronization engine 412 to those devices. If any devices are not on in the active device list, an activity can be scheduled (e.g., via activity scheduler 402) to transmit the predicate to the device when the device next becomes active.

Activity scheduler 402 can be a process (e.g., operating system utility, daemon, background process, etc.) executing on user device 110 that is configured to determine a time when the user context or device context (e.g., via local context database 114 and/or remote context database 116) is optimal for running a requested activity. Activity scheduler 402 can also perform activities based on an active device list 414. For example, a predicate to be sent to a device can be transmitted in response to an update to active device list 414.

Activity scheduler 402 can store a registration for an activity request in a local registrations store 416 or remote registration store 418 depending on whether the registration is local to the user device 110 or received from a remote device (e.g., user device 130). The registration can specify a condition associated with a context attribute and a code block in code block database 303 (or callback database 302). Registrations can be created based on an activity request received from context store 112. The activity request can be based on an activity requested by the context store 112 on behalf of a context client 118. Registrations can also be created based on a predicate received from a remote user device.

In some implementations, registrations can also be created based on an activity request received from a scheduler client 404. Scheduler client 404 can be a process (e.g., application, operating system utility, daemon, etc.) running on user device 110. Scheduler client 404 can submit an activity request to activity scheduler 402 to perform an activity (e.g., task, operation, etc.). For example, scheduler client 404 may need to perform a networking task (e.g., download data, upload data, communicate with other devices, etc.) that requires turning on Wi-Fi, Bluetooth, or other communications subsystems (e.g., radios). Scheduler client 404 can submit an activity request that specifies the need to access the network. In response to receiving the request, activity scheduler 402 can add a registration to local registrations store 416. If the request is associated with a predicate received from a remote device, a registration can be created in remote registration store 418. The registration can specify an action (e.g., access the network) and a context-based condition that indicates the best time for scheduler client 404 to perform the networking task. Based on changes to context store 112, activity scheduler can notify scheduler client 404 when scheduler client 404 can perform the networking task.

Activity scheduler 402 can also determine the optimum time to perform CPU intensive tasks, prefetch application data in anticipation of a user invocation of an application, and/or other tasks based on the parameters specified in the activity request. In some implementations, an activity request can specify a priority for the requested activity. For example, the priority (e.g., high, medium, low, maintenance) can be defined by scheduler client 404 or context store 112 within the activity request. Alternatively, the priority can be automatically determined by activity scheduler based on the identity or type of the scheduler client 404 or the type of requested activity. For example, when activity scheduler 402 receives an activity request from an operating system process (e.g., background process, daemon, etc.), activity scheduler 402 can assign a maintenance priority level to the activity request. When activity scheduler 402 receives an activity request from a frequently invoked user application (e.g., to prefetch application data from a network resource), activity scheduler 402 can assign a high priority to the activity request.

An activity request can specify a context for performing the requested activity. For example, scheduler client 404 may be a frequently invoked software application that is scheduling a prefetch activity to prefetch application data in advance of a user invocation of scheduler client 404. Scheduler client 404 can specify attributes and corresponding attribute values that define a user or device context during which the prefetch activity should be run.

The activity request can specify a network context. For example, if the activity will require a network connection, the activity request can specify a required network context. For example, the activity request can specify attributes and/or attribute values corresponding to a required network connection type (e.g., Wi-Fi, cellular, etc.), a required bandwidth (e.g., 10 megabits download, 4 megabits upload), and/or a required connection quality (e.g., high, medium, low, etc.).

The activity request can specify a user activity context. For example, the activity request can specify attributes and attribute values indicating that user device 110 not be in use by the user (e.g., “inUse” attribute=false), or that the user be asleep (e.g., “userSleeping”=true), or that the user is performing some other activity (e.g., driving, walking, running, etc.). The user activity context can include attributes and attribute values indicating that the device's display screen is lit and/or that the device is connected to a peripheral device, such as headphones, Bluetooth speakers, a wearable device, or an in-vehicle infotainment system in an automobile, for example.

The activity request can specify a power context. For example, the activity request can specify attributes and attribute values corresponding to a battery charge level of the device (e.g., a percent charge), a charging state (e.g., plugged in, charging, not plugged in, a particular stage of charging, etc.). The activity request can also specify a set of hardware resources that are used to perform the activity. Activity scheduler 402 can also determine the hardware resources that are used to perform the activity. Activity scheduler 402, based on characteristics of the requested activity, such as a predicate associated with the activity, can determine whether the activity should be performed when hardware resources become available or if hardware resources should be woken from a sleep state to perform the activity. For example, user device 110 may be a multi-processor user device having asymmetric or heterogenous processors. Activity scheduler 402 can use the power state of the various processors to determine when to perform scheduled activities.

For example, user device 110 can include, for example, system processor 420, system processor 430, accelerator 435, and application processor 440. System processor 420 and/or system processor 430 can be dedicated to performing certain system operations. Accelerator 435 can be a processor that is dedicated to accelerating certain operations on behalf of application processor 440. For example, accelerator 435 can be a graphics processor, graphics accelerator, or general-purpose graphics processor that can accelerate graphics operations and general-purpose compute operations. Accelerator 435 can also be, for example, a neural network processor or neural network accelerator that is optimized to perform computations that are common to neural network-based operations. Additionally, any of system processor 420, system processor 430, accelerator 435, and application processor 440 can be multi-core processors. The processors and their respective cores can have differing power requirements, with some processors or cores having higher power requirements, while other processors or cores have lower power requirements. In some implementations, some processors, such as the application processor 440 can include lower power and higher power processing cores.

Processors or processor cores with higher power requirements can have higher performance relative to the lower power cores. However, to reduce the overall power consumption of user device 110, the higher-power/higher-performance processors or processor cores may spend relatively larger amounts of time in a low-power or sleep state relative to lower power processors or cores. Processors or cores with higher power requirements can be transitioned to an active state to perform interactive activities or when lower power processors become overloaded. The higher-power processors or cores can then transition back into a low-power state. The lower power processors can be used to handle lower priority tasks, such as background or non-interactive tasks that may be performed without waking the higher power processors.

In one implementation, system processor 420 can be a baseband processor or network processor that manages radio functions of a cellular, Wi-Fi, Bluetooth, or other network interface. In such implementation, system processor 420 may execute a separate operating system than operating system 410. System processor 420 can include a synchronization apparatus 422 that can be used to facilitate the synchronization of context data, context queries, device state, predicates, and other data that is to be synchronized or transmitted to remote devices. Data to be synchronized can be transmitted to system processor 420 by system processor 430 or application processor 440 on behalf of activity scheduler 402. System processor 420 can synchronize or transmit the data via the synchronization apparatus 422. Data received via the synchronization apparatus can be transmitted to a component of operating system 410 via system processor 420, system processor 430, and/or application processor 440.

Figure 5:
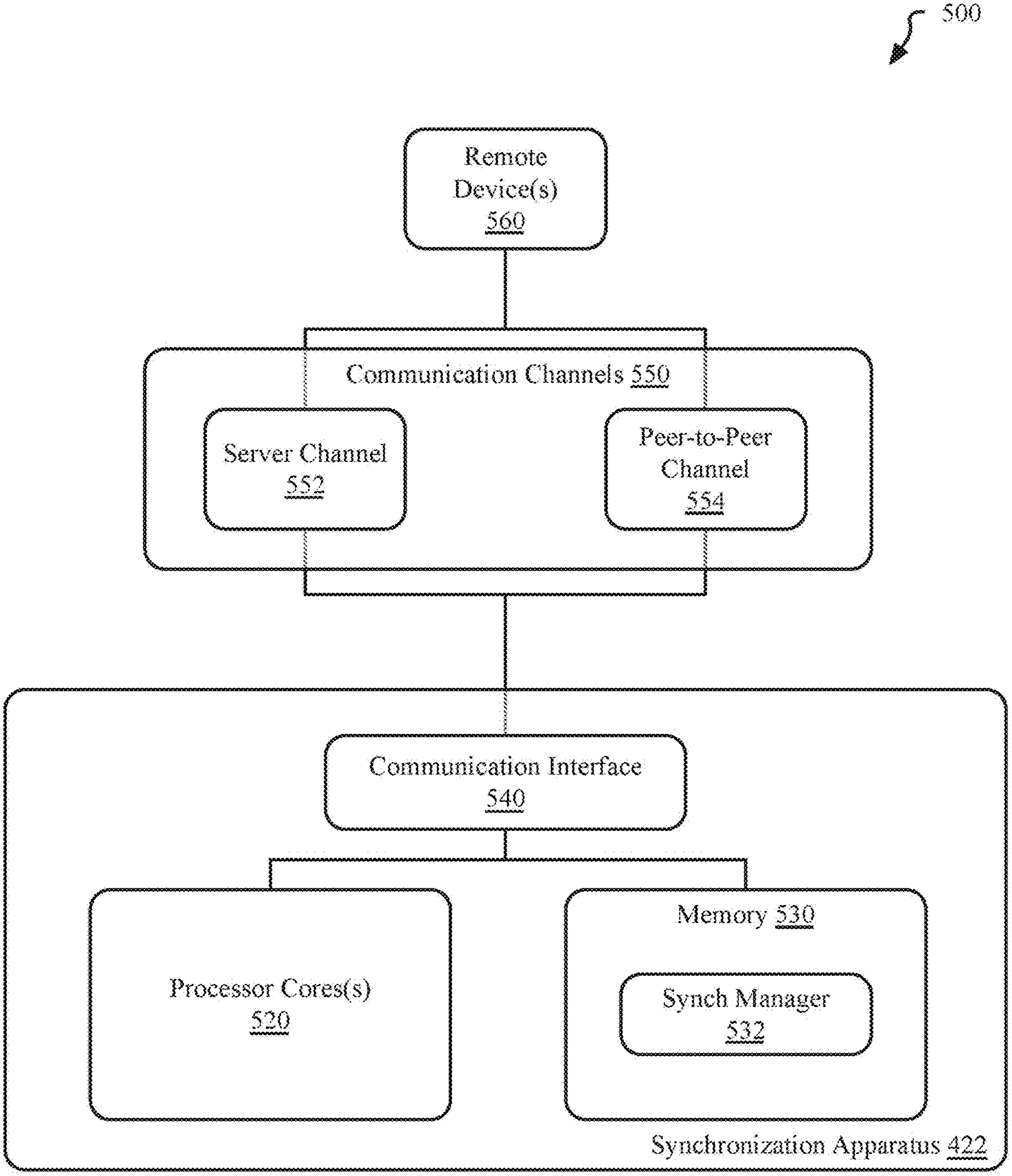
FIG. 5 illustrates a synchronization system for multi-device context data.

FIG. 5 illustrates a synchronization system 500 for multi-device context data. Synchronization system 500 includes synchronization apparatus 422, which can be used to synchronize context data, context queries, device state, predicates, or other multi-device context data with one or more remote devices 560. Synchronization apparatus 422 can be included within a system processor 420, as shown in FIG. 4. Synchronization apparatus 422 can include one or more processors cores 520 that communicatively coupled to memory 530 and to communication interface 540. In one implementation, a data synchronization manager 532 can reside in the memory 530. Data synchronization manager 532 can be executed by the one or more processor cores 520. Communication interface 540 can be configured to provide a communication connection between the synchronization apparatus 422 and one or more remote devices 560 via one or more communication channels 550. The communication channels 550 can include including a server channel 552 or a peer-to-peer channel 554. The server channel 552 can be established via a server (e.g., server device 170, cloud server 172) using a connection established via a network (e.g., network 190). The peer-to-peer channel 554 can be established using peer-to-peer communications technologies such as near field communication (NFC), Bluetooth, Bluetooth LE, or peer-to-peer Wi-Fi, for example. Determination as to whether to communicate over the server channel 552 or the peer-to-peer channel 554 can be performed based on a policy specified by the data synchronization manager 532 and whether the one or more remote devices 560 are within wireless range.

In one implementation the one or more processors cores 520 can be processor cores of a wireless baseband processor, which can be used to establish communication channels 550 with the remote devices 560 on behalf of an application processor (e.g., application processor 440) or system processor (e.g., system processor 430). The synchronization apparatus 422 can maintain the communication channels 550 with the remote devices 560 while the application processor or system processor is in a low power or sleep state. In some configurations an electronic device can enter a wake on wireless state in which one or more components of the device enter a low power state, while the one or more processor cores 520 can maintain an at least partially active state to receive messages transmitted by one or more remote devices 560. The one or more processor cores 520, based on received data or metadata, can wake the device into an at least partially active state or maintain the low power state for the device. When waking from a wake on wireless state, low power processors can be activated initially to handle incoming data. The low power processors can then activate higher-power processors as needed.

Figure 6:
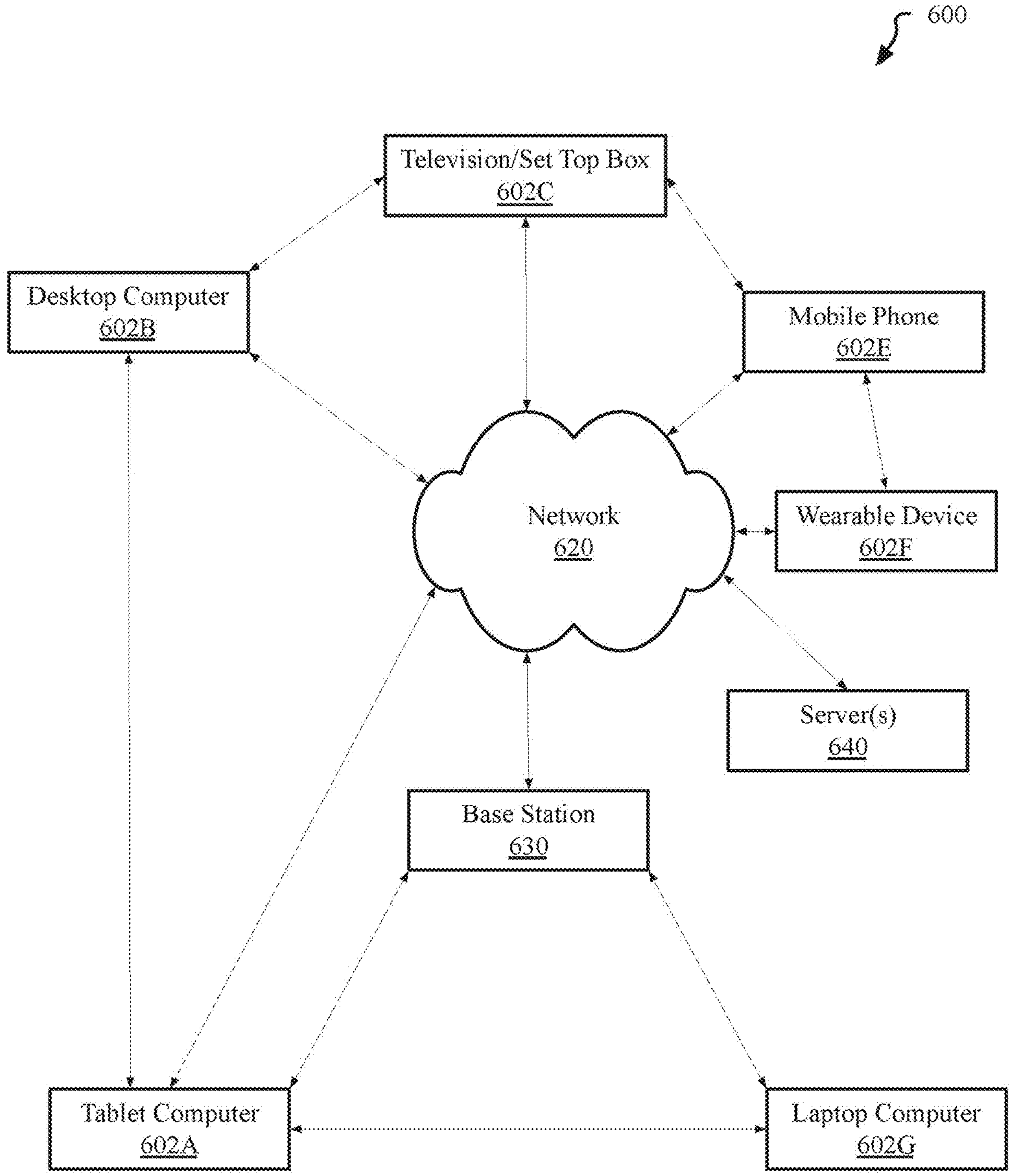
FIG. 6 is a schematic illustration of an overview of a network environment in which multi-device context synchronization may be implemented.

FIG. 6 is a schematic illustration of an overview of a network environment 600 in which multi-device context synchronization may be implemented. The network environment 600 can include one or more electronic devices such as a tablet computer 602A, a desktop computer 602B, a television or set top box 602C, a mobile phone 602E, wearable device 602F, and/or a laptop computer 602G, which may be referred to collectively as electronic devices 602. Electronic devices 602 within range of one another can establish a peer-to-peer communication channel via a direct communication link (e.g., a Bluetooth link, an infrared (IR) link, NFC, Wi-Fi direct, or the like). Further, the electronic devices 602 can be connected to a network 620, either directly or via a connection to a base station 630. The base station 630 can be, for example, a network access device (e.g., a router, cellular base station or the like) which provides the electronic devices 602 with network access.

The network 620 can be any suitable type of wired or wireless network such as a local area network (LAN), a wide area network (WAN), or combination thereof. A LAN can be implemented using various network connection technologies such as, but not limited to Ethernet, wireless LAN (e.g., Wi-Fi), and/or wireless personal area networks (WPAN). LAN communication over the network 620 can be performed using network protocols such as, but not limited to transmission control protocol (TCP) and Internet protocol (IP). A WAN can be implemented over various physical layer types including fiber-optic and copper cabling using protocols such as, but not limited to synchronous optical networking (SONET) and synchronous digital hierarchy (SDH). Network 620 may be, for example, network 190 as in FIG. 1.

The various electronic devices 602 can establish a connection with a remote storage location located on one or more servers 640. The one or more servers 640 can be, for example, server device 170 or cloud server 172. The remote storage location on the one or more servers 640 can be used to synchronize data, including multi-device context data, between the electronic devices 602. The multi-device context data can be used to synchronize device behavior and/or activity information between the various devices associated with a user account or family of user accounts. Synchronized device behavior or activity information can include, for example, device movement data, user health data, and/or an amount of time spent using a particular application.

The device behavior synchronization can facilitate seamless transition between devices as the user transitions from device to device. For example, user actions or activity performed on a tablet computer 602A can be synchronized with a mobile phone 602E of the user when the user transitions from use of the tablet computer 602A to the mobile phone 602E. In one embodiment, device behavior or activity information can transition between any of the illustrated electronic devices 602 within the network environment 600. Synchronization can be performed via the network 620 using the one or more servers 640 or can be performed via a peer-to-peer connection between the electronic devices 602.

Before a peer-to-peer communication channel is established between electronic devices 602, a peer discovery and pairing process is performed between the devices. The peer discovery process enables the electronic devices 602 to discover and preemptively establish connections between device before data is available to be synchronized between the electronic devices 602. The peer discovery process, in some instances, can also include user verification that communication the electronic devices 602 should occur. In some embodiments, peer discovery can leverage existing service discovery protocols that facilitate locating devices and/or services on a wireless or other network, such as the Simple Service Discovery Protocol (SSDP) developed by the UPnP Forum or the Bonjour networking technology developed by Apple Inc. (published as IETF RFC 6762 and IETF RFC 6763 and referred to herein as "Bonjour"). In a device discovery service, a device can advertise information indicating its existence, address, and optionally additional information about its capabilities. Other devices can browse the advertisements and identify devices of interest based on the broadcast information. Using the advertised address, a browsing device can initiate communication with the advertiser.

Depending on the network and discovery service, advertising can optionally include real-time broadcasting of information (e.g., through a multicast or beacon signal) and/or providing advertisement information to a central repository (e.g., at a network access point) from which other devices can retrieve the information. Browsing of advertisements can include detecting broadcast advertisements and/or retrieving advertisement information from the central repository. In some embodiments, electronic devices that are attached to a power source, such as an electrical outlet, can continuously perform advertisement and discovery for the peer-to-peer connection service. Mobile user devices can enable discovery of the peer-to-peer connection service based on the location of the user device. For example, and in one embodiment, a geo-fence trigger is enabled on the mobile device, such that peer-to-peer connection discovery is enabled when the mobile device is within a geographic proximity to a location designated as the home location of the user device.

In one implementation, wireless advertisements can be used for multi-device synchronization. For example, any of the electronic devices 602 can broadcast an advertisement packet, such as a Bluetooth LE advertisement packet, that identifies the device and includes a payload encoded with context data to be synchronized with other devices. Other devices can listen for and receive the advertisement packet, determine that the advertisement is from a user device associated with the same user account, and decode the context data included in the advertisement payload. The devices can then store the context data update in their respective remote context databases.

When one of the electronic devices 602 is discovered by another one of the electronic devices 602, a network data connection (e.g., TCP, UDP, etc.) can be established between the devices. To avoid connection races between devices that are both advertising and discovering, the device with the lexicographically lower persistent identifier initiates the connection between devices. The persistent identifier of a device is derived from an anonymized identifier that is advertised via the discovery service. In one embodiment, to derive the persistent identifier based on advertised information make use of data exchanged via a previously performed pairing process. In such implementation, a data connection cannot be established between devices until some form of data exchange is performed between devices, such as, for example, if the devices are in wireless radio range of each other. Alternatively, the devices each come into possession of shared secret data, which can be distributed to the devices if the devices are each associated with a user account of a family of user accounts. This pre-connection data exchange can enable the electronic devices 602 to learn a persistent identifier for each device that can be used to establish a peer-to-peer connection. Once a data connection is established, a secure communication session can be established between the communal smart home device and the companion device. The communal smart home device and the connected companion device can then exchange presence and reachability information. Once interconnected, the electronic devices 602 can enter a wake-on-wireless (WoW) state as needed, when data is not being exchanged over the peer-to-peer connection. In one implementation, an electronic device that is connected to a power source can remain active to reduce first-message latency.

In the event connectivity is lost between electronic devices 602, the discovery service can be re-enabled and used to search for the device on the local network. If the missing device is re-discovered, the data connection between devices can be re-established. If the missing device cannot be discovered, state discovery service information in the records of the missing device is reconfirmed and cleaned. The searching device can then attempt to establish communication with the missing device via a secure internet session. In one implementation, part of the presence and reachability information exchanged when establishing a data connection includes a device identifier, identifier token, relay identifier, or another form of identification token that can be used to reach or enable message exchange with the missing device, for example via a peer-to-peer or relayed Internet connection. If a secure Internet connection can be successfully established over the network 620 with the previously missing device, peer-to-peer connection messages can be exchanged over the secure Internet connection.

In the event interconnected electronic devices 602 are connected over the network 620 (e.g., via an Internet-based connection) and a local connection becomes available, a peer-to-peer connection can be established via the electronic devices 602. For example, if mobile phone 602E were to cross a geo-fence boundary, the mobile phone 602E can enable a discovery protocol (e.g., SSDP, Bonjour, etc.) to search for other electronic devices 602. In one implementation, connection switching can be performed whenever connectivity is lost between connected electronic devices 602 or if the devices determine that a better connection is available. Local connections can be preferred to Internet connections, as local connections presumably are lower latency. Additionally, it may be less resource intensive from a device and infrastructure standpoint to maintain a local connection instead of an Internet connection. For example, where device behavior or activity synchronization is to occur between electronic devices 602 via the one or more servers 640 over the network 620, the rate of data exchange between the electronic devices 602 may be throttled due to server demand. In one implementation, the electronic devices 602 can provide updates to certain types of data to the one or more servers 640 only during specified update interval for the electronic devices 602. Further updates may be delayed until the next update interval. However, local data exchange between the electronic devices 602 can occur unthrottled and at lower latency using a peer-to-peer connection between devices. In one implementation, the various peer-to-peer connection can be used as a mesh relay to propagate device activity updates across the set of electronic devices 602, provided that the electronic devices have an established trust relationship.

In one implementation, some devices, such as the wearable device 602F (e.g., electronic watch device or another wearable electronic accessory) can synchronize data over a peer-to-peer channel 554 with another device (e.g., a mobile phone 602E) while also synchronizing data via a connection over a server channel 552 via the network 620. For example, the wearable device 602F can have a primary synchronization channel with a companion electronic device, such the mobile phone 602E. The wearable device 602F can also receive synchronization data via the server channel 552, for example, while the wearable device 602F is charging. In one implementation, some data to be synchronized with the wearable device 602F can be synchronized with the mobile phone 602E or another companion device. Dividing synchronization duties between the wearable device 602F and the mobile phone 602E can enable rich data to be delivered to the wearable device 602F in a timely manner without negatively impacting the power and performance of the wearable device 602F.

Figure 7C:
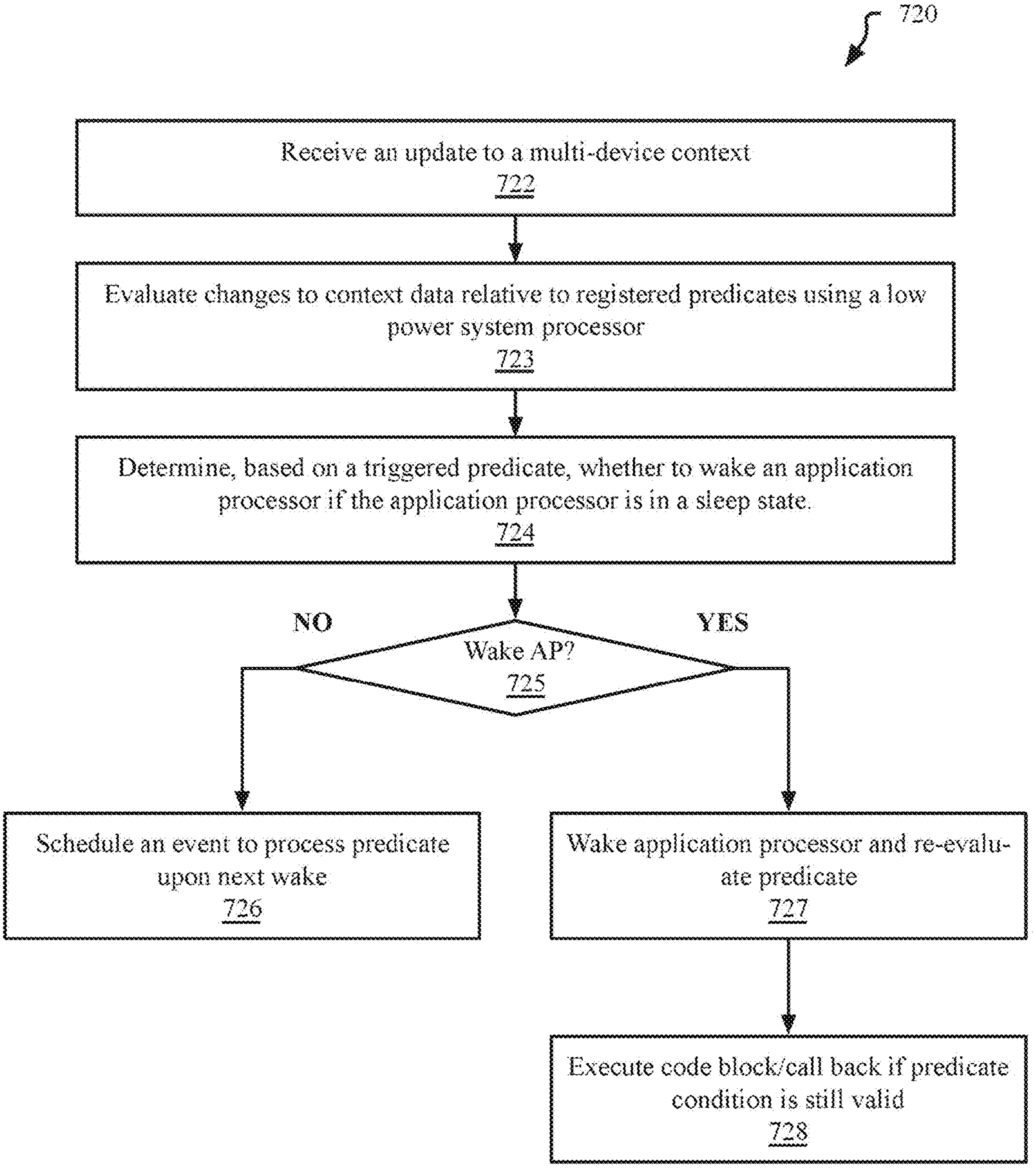

FIG. 7A-7C illustrates methods of conditionally performing local or remote actions based on a synchronized multi-device context. FIG. 7A illustrates a method 700 of performing activities based on a predicate that is transmitted to a remote device. FIG. 7B illustrates a method 710 of performing activities based on a predicate that is received from a remote device. FIG. 7C illustrates a method 720 to determine whether to wake an application processor in response to a multi-device context event. The illustrated methods can be performed by software and hardware logic on an electronic device.

As shown in FIG. 7A, a context store client on a requesting device can construct a predicate that includes a code block to be conditionally executed based on attributes of a multi-device context store (block 702). The predicate can include a condition relative to a context attribute of the multi-device context store and can specify or be associated with a set of remote devices to which the predicate is to be transmitted. The predicate additionally includes one or more code blocks to be conditionally executed. The predicate can be a compound predicate that specifies multiple conditions and/or code blocks. In one implementation, the predicate condition can include a key path that specifies a specific context attribute or event and an identifier for the device for which the context is to be monitored for changes to the specified attribute. The set of devices to which the predicate is to be transmitted can differ from the devices specified in the key path.

The context store client can transmit the predicate to a context store daemon on the requesting device (block 703). The context store daemon, using a synchronization engine, can transmit the predicate to remote context store of a remote device (block 704). The remote device can register the predicate and execute the code block upon the occurrence of the specified condition. Executing the code block on the remote device can cause a context change on the remote device. The context change on the remote device will be synchronized with the requesting device via a remote context database on the requesting device. The requesting device can receive context store changes from the remote device in a context store update (block 705). The requesting device can then store the changes in a remote context database that is specific to the remote device (block 706).

The requesting device can optionally evaluate changes to the context store in relation to one or more attributes of the multi-device context (block 707). In one implementation, the attributes associated with the predicate condition can be evaluated to verify that the proper remote actions occurred. The change to the remote context can optionally trigger a code block or callback associated with the one or more attributes (block 708). For example, a local callback on the requester can be triggered or a code block associated with a different predicate received at the requesting device can be executed in response to the change in the remote context database associated with the remote device. Additionally, the requesting device may unregister the predicate sent to the remote device or send a new predicate to the remote device.

As shown in FIG. 7B, an electronic device can receive a predicate from a remote device (block 712). The predicate can include a conditional that references a key path that specifies a specific context attribute or event and an identifier for the device for which the context is to be monitored. The predicate also includes a code block to execute upon the occurrence of the condition.

The electronic device can store the code block in a code block database (block 713). The electronic device can then create a registration for the predicate in a registration database (block 714). The registration references the predicate condition and the code block to conditionally execute based on the predicate condition.

The context store daemon on the electronic device can monitor the multi-device context for changes (block 715). The context store daemon can detect a change to a context in a context database of multi-device context (block 716). When a change is detected, the context store daemon can evaluate the context change relative to the registration for the predicate (block 717). In one implementation, the context store daemon will not evaluate the change unless the change may impact a registered predicate or another registered conditional, such as an outstanding context query.

The electronic device can trigger the code block in the code block database when the change matches the conditional for the predicate (block 718). The code block can do any number of actions, including performing a local action on the electronic device, sending a notification to a remote device, or simply triggering the synchronization of the local context on the electronic device with a remote context database on a remote device. In some implementations, the code block can send a notification to the originating device of the predicate that indicates that the predicate has been triggered. In other implementations, the context store daemon automatically sends a notification to the originating device when a predicate is triggered. The context store daemon, via a synchronization engine, can also synchronize the local context database with a remote context database on any remote devices that are synchronizing context with the local device (block 719). A snapshot of the context can be synchronized in response to the triggering of the predicate or specific context attributes can be synchronized if those attributes are changed in response to execution of the code block associated with the predicate. A requesting device that transmits a predicate to a remote device can also perform actions based on context data that is synched back to the requesting device from the remote device.

In one implementation, the specific timing of the execution of a code block or performing a response can be optimized by an activity scheduler (e.g., activity scheduler 402) based on context and/or device state of the electronic device, including whether an appropriate processor is active to execute the code block. As shown in FIG. 7C, respective activity schedulers on the remote and originating device can be used to determine the optimal time to trigger a predicate response on the remote device and/or respond to a notification of a triggered predicate.

Turning to FIG. 7C, an electronic device can receive an update to a multi-device context (block 722). The electronic device can evaluate changes to the context data relative to registered predicates using a low power system processor (block 723), as described above with respect to FIG. 4. The electronic device can then determine, based on a triggered predicate, whether to wake an application processor, or another higher-power processor, if the application processor is in a sleep state (block 724). The determination as to whether to wake the processor can be performed based on a combination of system policy, a predicate whitelist that is allowed to wake the application processor, and/or whether the predicate includes a flag that indicates that a processor wake is requested. When logic on the electronic device (e.g., activity scheduler 402) determines not to wake the application processor (NO at block 725), the electronic device can schedule an event to process the predicate upon the next wake of the application processor (block 726). If logic on the electronic device determines to wake the application processor (YES at block 725), the electronic device can wake the application processor and re-evaluate the predicate (block 727). In one implementation, the application processor can be used to evaluate the predicate. The application processor can then execute a code block or call back of the predicate if the predicate condition is still valid (block 728).

Figure 8A:
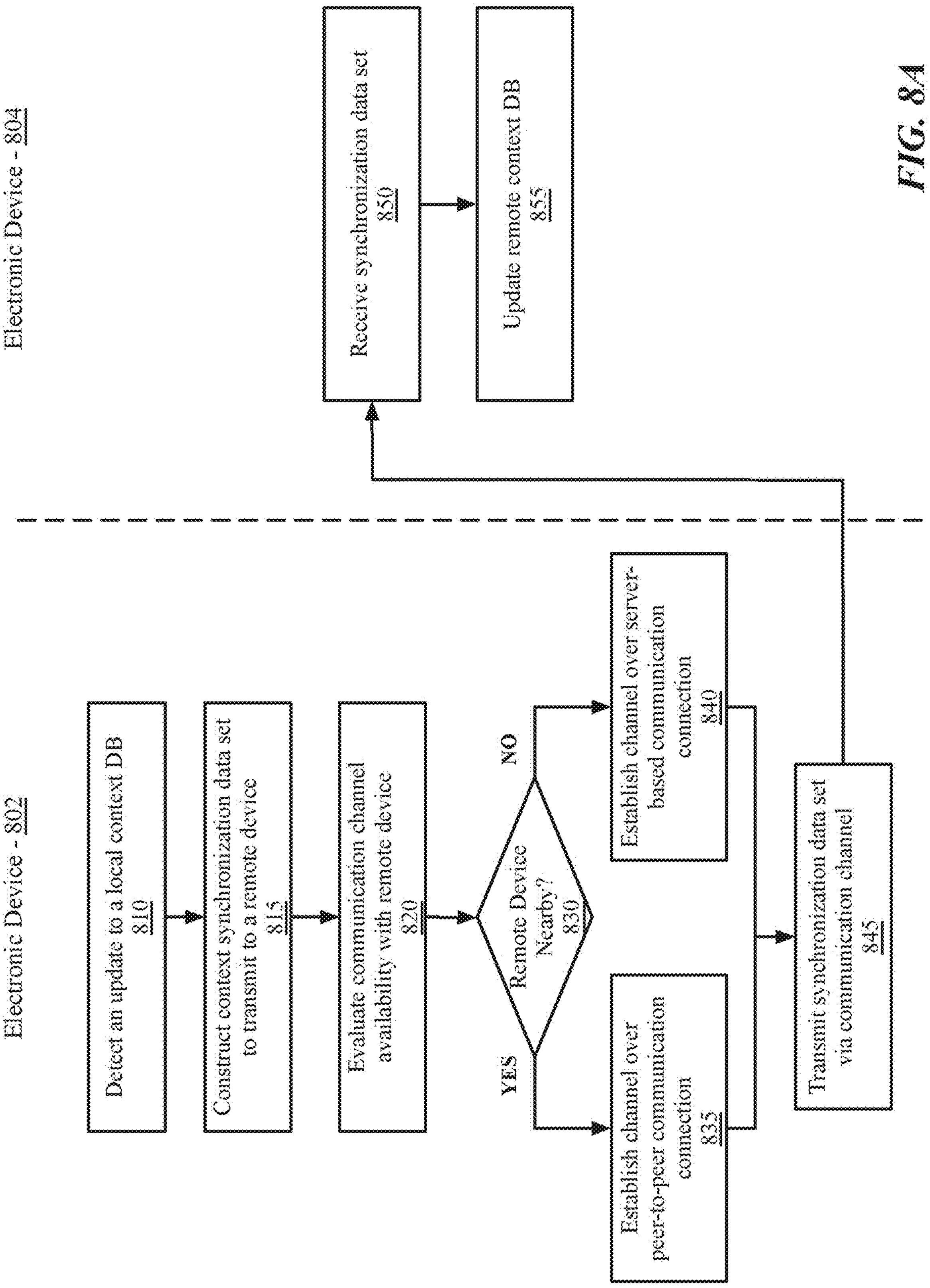

FIG. 8A-8B illustrates techniques to synchronize multi-device context data via over multiple communication channels. FIG. 8A illustrates operations to synchronize multi-device context data via one of multiple communication channels. FIG. 8B illustrates a method 860 to synchronize context data via wireless radio advertisements. Synchronization of multi-device context data can include the synchronization of local context changes to a remote context database on a remote device. In some instances, predicates and queries to be transmitted to a remote device can also be synchronized using the illustrated techniques.

As shown in FIG. 8A, an electronic device as described herein (e.g., electronic device 802) can synchronize multi-device context data with another electronic device (e.g., electronic device 804). Electronic device 802 can detect an update to a local context database (block 810). Electronic device 802 can then construct context synchronization data set to transmit to a remote device (block 815). Electronic device 802 can evaluate communication channel availability for communication with electronic device 804 (block 820). The communication channels can include a server-based channel, for example, though a cloud server (e.g., cloud server 172) via a combination of LAN and WAN networks. The communication channels can also include a peer-to-peer communication connection, such as a Bluetooth, local network (e.g., Wi-Fi LAN), or peer-to-peer Wi-Fi connection.

The determination of communication channel can be performed in part based on whether the electronic devices are close enough for direct wireless communication. If electronic device 802 detects electronic device 804 within wireless range, (YES at block 830), electronic device 802 can establish a peer-to-peer communication channel (block 835). If electronic device 804 is not nearby (NO at block 830), electronic device 802 can establish a server-based communication connection (block 840). Electronic device 802 can then transmit the synchronization data set vis the selected communication channel (block 845). Electronic device 804, can receive the synchronization data set (block 850) and then update a remote context database (block 855).

As shown in FIG. 8B, an electronic device as described herein can receive a predicate from a remote device (block 862). The electronic device can create a registration (e.g., a remote registration) for the predicate (block 863). The electronic device can then set application processor to a low power state (block 864). While the application processor is in the low power state, the electronic device can detect a context change in a local context DB that is relevant to the predicate (block 865). Instead of waking the application processor, the electronic device can attempt to detect the nearby presence (e.g., within wireless range) of the remote device via a low-power processor (block 866). If the remote device is within wireless range, the electronic device can update a payload in a wireless radio (e.g., Bluetooth) advertisement beacon to indicate a change in local context DB associated with the registration from the remote device without waking an application processor (block 867). The advertisement beacon can simply indicate that a relevant change has occurred or can include the context update. The remote device can then update its remote context database using the data received from the advertisement beacon.

Figure 9A:
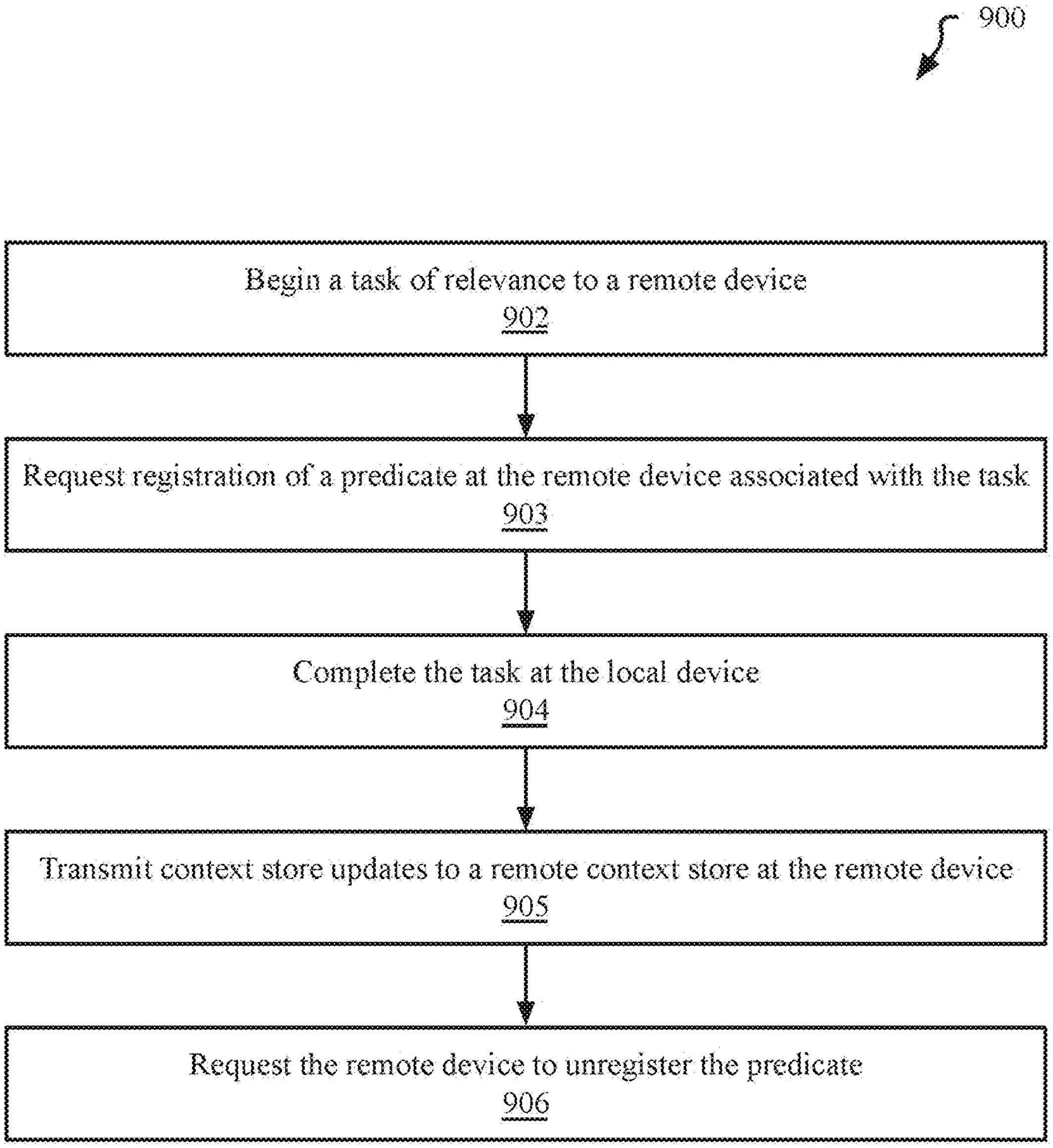
FIG. 9A-9C illustrate the use of multi-device context to perform exemplary device operations.
Figure 9B:
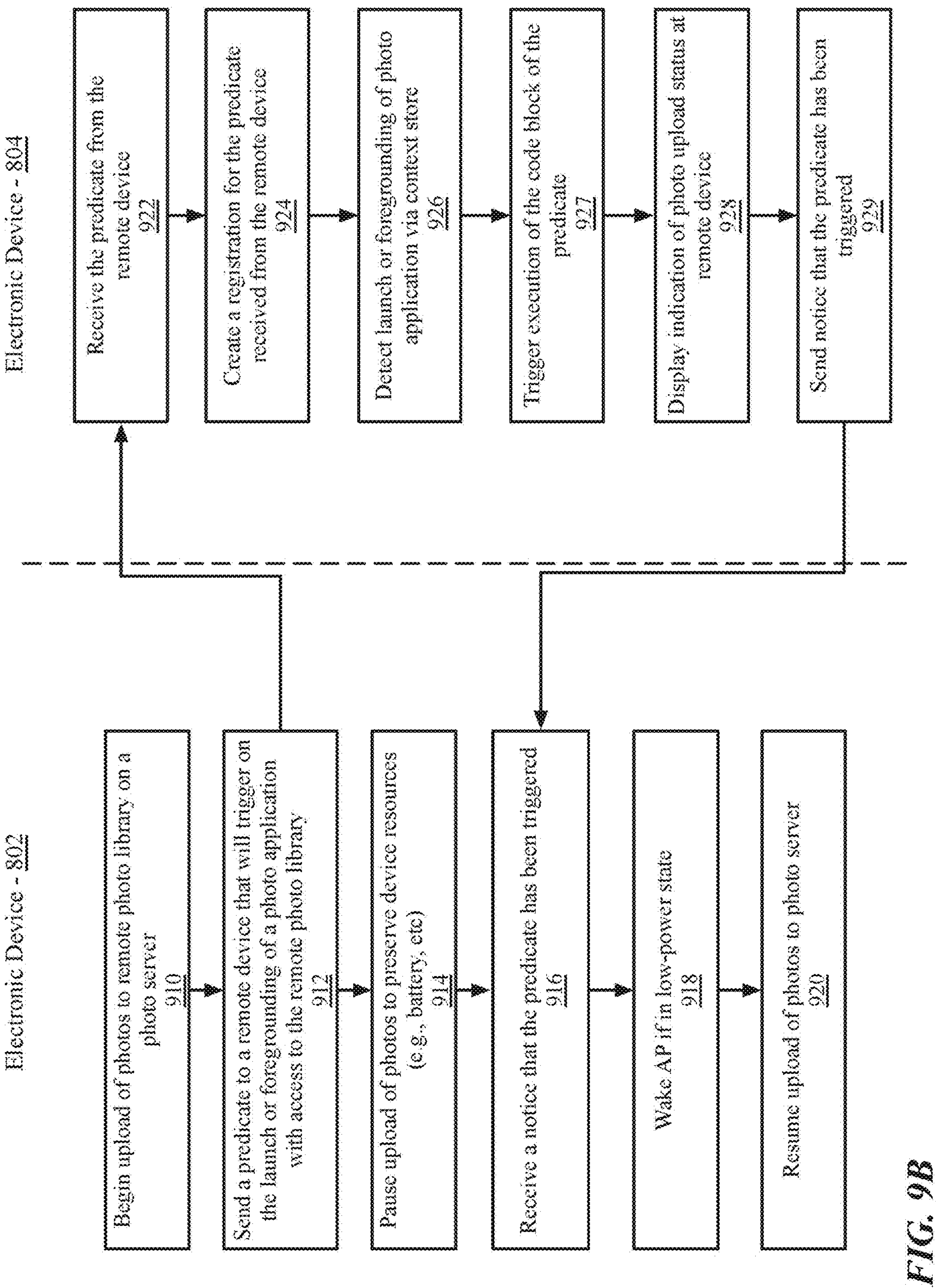
Figure 9C:
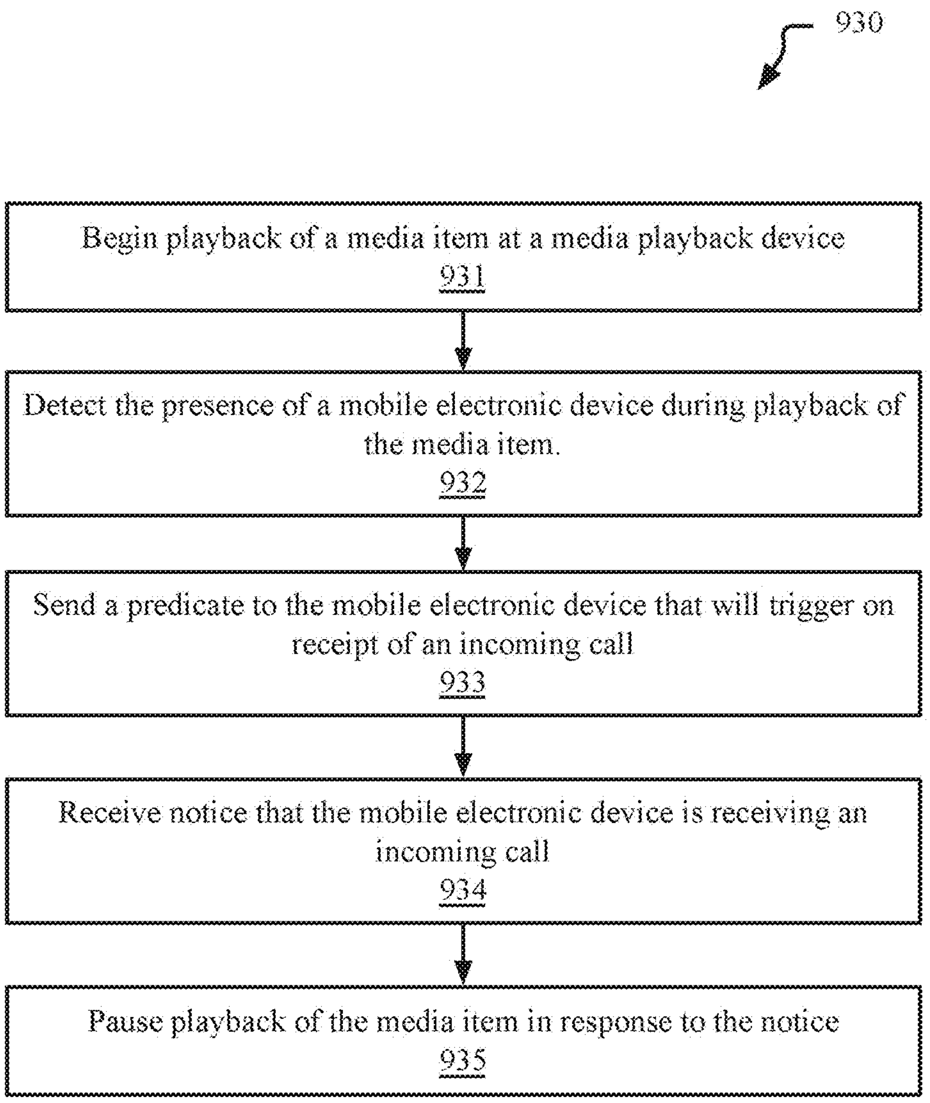

FIG. 9A-9C illustrate the use of multi-device context to perform exemplary device operations. FIG. 9A illustrates a method 900 of registering remote predicates while performing a local operation of relevance to a remote device. FIG. 9B illustrates exemplary operations to that notify remote devices when a local device has a pending upload of photos to a photo server. FIG. 9C illustrates a method 930 to pause media playback on a remote device in response to receipt of an incoming call at a nearby mobile device.

As shown in FIG. 9A, an electronic device can begin a task of relevance to a remote device (block 902). The task of relevance can include, for example, uploading data to a cloud server, such as documents, data files, or photographs. The task of relevance can also include receiving an incoming voice or video call at a mobile phone. Tasks of relevance are generally tasks that have some degree of duration, rather than tasks that can be completed instantly. The electronic device can then request registration of a predicate at the remote device associated with the task (block 903). The predicate can specify the remote devices that are relevant. The electronic device can then transmit the predicate to the set of remote devices of relevance. The set of relevant devices identified by the predicate is not required to be the same as the set of devices to which the predicate is transmitted. For example, a predicate can specify a condition that is based on context of a wearable device and transmit the predicate to a companion device of the wearable device. Upon completion of the task at the local device (block 904), the electronic device can transmit context store updates to a remote context store at the remote device (block 905). The electronic device can then request the remote device to unregister the predicate (block 906), as the predicate is no longer relevant.

FIG. 9B shows exemplary operations that can be performed on multiple electronic devices based on method 900. For example, when an electronic device (e.g., electronic device 802) has data to upload to a cloud server, such as photographs taken with the device, there may be a delay before the photographs are uploaded to the cloud server. Electronic device 802 can inform other devices (e.g., electronic device 804) that an upload of photographs is pending but has not yet completed. If a user attempts to use electronic device 804 to view the photographs before the photographs have been uploaded, electronic device 804 can display information that indicates that an upload of photo data is pending on electronic device 802. If the upload of the photo data has been paused on electronic device 802, then electronic device 802 can immediately resume the upload of the photographs upon notice that the user is attempting to view the photographs on electronic device 804.

In one implementation, electronic device 802 can begin an upload of photos to a remote photo library on a server device (block 910). Electronic device 802 can then send a predicate to the remote device that will trigger on the foregrounding of photo application on the remote device, where the photo application has access to the remote photo library (block 912). The predicate can be transmitted to the remote device (e.g., electronic device 804) via communication and synchronization techniques described herein, including by sending a standalone message to electronic device 804 or by sending the predicate while synchronizing other context data. A peer-to-peer or server-based communication connection can be used. The predicate may not be immediately transmitted to electronic device 804 if electronic device is not on the active device list (e.g., active device list 414). Additionally, the predicate can be transmitted to devices other than electronic device 804. For example, a predicate registration request can be sent to all devices associated with the user account of electronic device 802. In one implementation, electronic device 802 and register the predicate as soon as photos are available to upload, before the actual process of uploading the photos has begun.

Electronic device 804 can receive the predicate from electronic device 802 (block 922) and create a remote registration for the predicate (block 924). The remote registration can indicate that the code block of the predicate should be executed upon detection of the launch or foregrounding of a photo application that can be used to view photos on the shared photo library. If electronic device 804 detects the launch or foregrounding of the photo application via the context store daemon on the device (block 926), the device can trigger the execution of the code block of the predicate (block 927). The code block can perform various operations on electronic device 804, including causing the device to display an indication of the photo upload status at electronic device 802 (block 928). The photo upload status can indicate that electronic device 802, for example, has photos that are pending upload, has photos that have begun to upload but are not yet complete, or that the photo upload process has begun but has been paused or throttled to preserve resources on electronic device 802. The photo upload status can be shown based on context information at electronic device 802 that has been synchronized to electronic device 804 after the predicate is registered at electronic device 804. In one implementation, the code block of the predicate can include logic to fetch the current photo upload status of electronic device 802 if the upload status for electronic device 802 that is stored in the remote context database of electronic device 804 has not been recently updated. During execution of the code block of the predicate, or as a result of execution of the code block of the predicate, electronic device 804 can send a notice to electronic device 802 that the predicate has been triggered (block 929). Electronic device 804 can also synchronize its local context with the remote context database at electronic device 802. Data transmitted by electronic device 804 during synchronization of the local context database can piggyback along with the notice sent to electronic device 802.

Electronic device 802 may, for a variety of reasons, pause the upload of the photos to preserve device resources (block 914). Upload of the photos to the shared photo library may be paused, for example, to preserve battery charge or system memory. While upload of photographs is pending and paused, electronic device 802 may receive notice that the predicate has been triggered on electronic device 804 (block 916). The notice can also include a snapshot of remote context data from electronic device 804. In response to the notice that the predicate has been triggered or in response to the receipt of the remote context snapshot, electronic device 802 can wake an application processor if the application processor is in a low-power state (block 918). Electronic device 802 can then resume the upload of the photos to the photo server (block 920) using program logic executed by the application processor, which allows the user to view the photos on electronic device 804.

In addition to the example above, a media playback device such as a smart speaker device, a television, or a television set top box, can use similar multi-device context operations as shown in FIG. 9B to enable the media playback device to pause playback of media (e.g., music, podcast, television show, movie, etc.) when an incoming call is received at a nearby mobile device.

As shown in FIG. 9C, the method 930 to pause media playback on a remote device in response to receipt of an incoming call at a nearby mobile device can include to begin playback of a media item at a media playback device (block 931). The media item can be stored on the media playback device or streamed to the media playback device via a network interface. The media playback device can detect the presence of a mobile electronic device during playback of the media item (block 932). In one implementation, the mobile electronic device uses the same user account as the media playback device, which enables synchronization of multi-device context between the devices. The media playback device can detect the presence of the mobile electronic device via presence and reachability information exchanged between devices associated with the same user account. Other techniques can also be used to enable the media playback device to detect the presence of the mobile electronic device.

For example, the media playback device can detect the presence of the mobile electronic device via a wireless beacon advertisement that is broadcast by the mobile electronic device. The media playback device can also detect the presence of the mobile electronic device on a local area network, for example, via a service advertisement broadcast over the network by the mobile electronic device. In one implementation, the media playback device can detect the presence of the mobile electronic device via a context attribute of the multi-device context that is received from the mobile electronic device. For example, the media playback device in the home location of a user can detect, via a remote context database on the media playback device, that the current location attribute of the mobile electronic device has been updated to the home location of the user. Whether the mobile electronic device is present can further be determined based on an estimation of distance between the media playback device and the mobile electronic device. Distance can be determined based on one or more wireless ranging technologies, such as ultra-wideband ranging or received signal strength indication (RSSI).

The media playback device can send a predicate to the mobile electronic device that will trigger upon receipt of an incoming call (block 933). The incoming call can be a voice or video call that is received over a voice and/or data network. The predicate can be triggered in response to a user answering an incoming call or in conjunction with playing a call announcement (e.g., ringtone) at the mobile electronic device. If the mobile electronic device receives (or the user answers) an incoming call, the predicate will be triggered on the mobile electronic device, which causes the mobile electronic device to execute a code block associated with the predicate and/or send a notice to the media playback device that the predicate has been triggered.

The media playback device will then receive notice that the mobile electronic device is receiving an incoming call (block 934). The notice can be a direct notice that is received in response to the triggering of the predicate on the mobile electronic device. The notice can also be the detection of a change in a remote context database on the media playback device in response to the change in context state at the mobile electronic device. In response to the notice, the media playback device can pause playback of the media item (block 935).

Additional Exemplary Device Architectures

Figure 10:
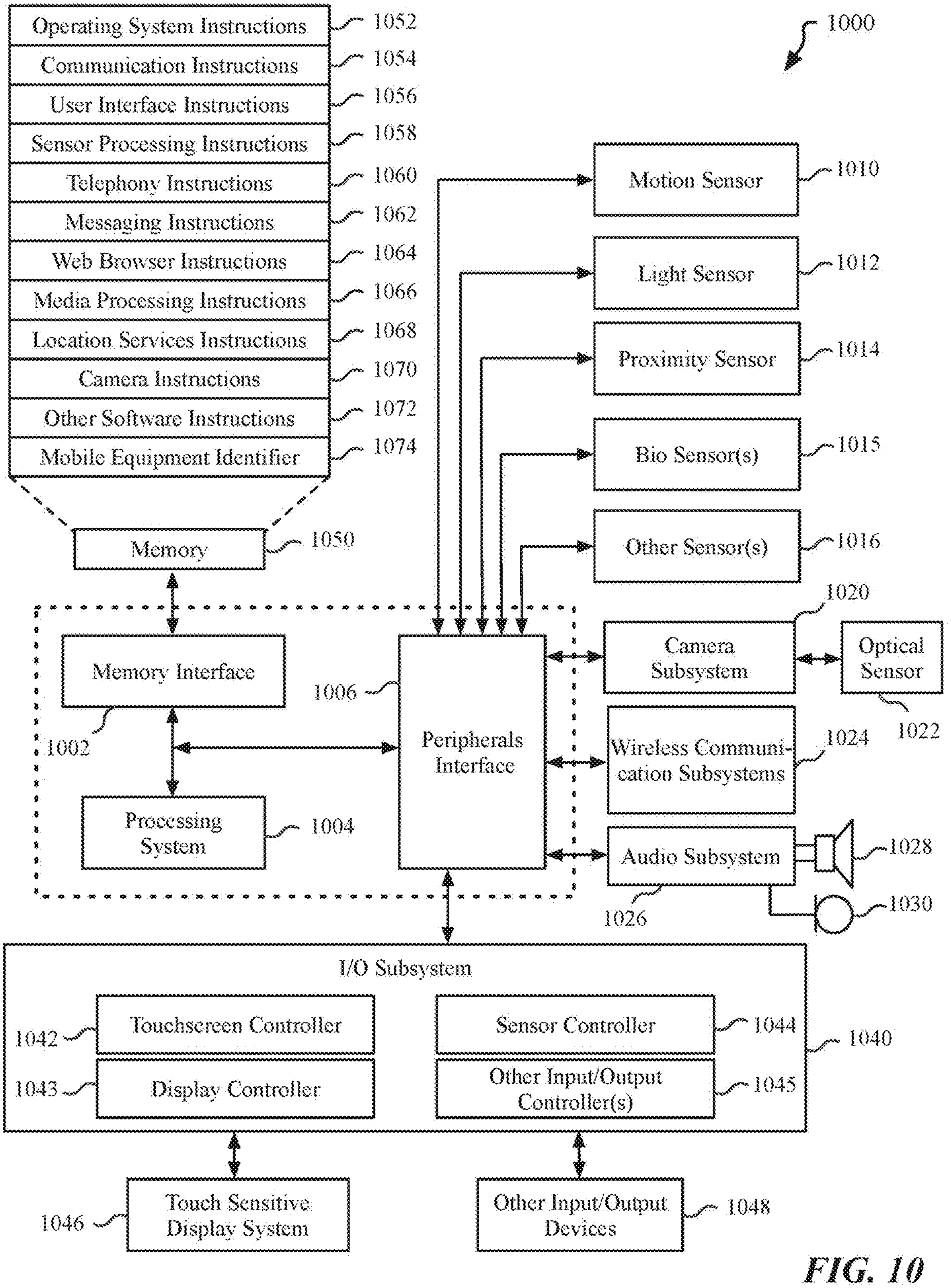
FIG. 10 is a block diagram of a device architecture for a mobile or embedded device, according to an embodiment.

FIG. 10 is a block diagram of a device architecture 1000 for a mobile or embedded device, according to an embodiment. The device architecture 1000 includes a memory interface 1002, a processing system 1004 including one or more data processors, image processors and/or graphics processing units, and a peripherals interface 1006. The various components can be coupled by one or more communication buses or signal lines. The various components can be separate logical components or devices or can be integrated in one or more integrated circuits, such as in a system on a chip integrated circuit.

The memory interface 1002 can be coupled to memory 1050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the mobile device functionality. One or more biometric sensor(s) 1015 may also be present, such as a fingerprint scanner for fingerprint recognition or an image sensor for facial recognition. Other sensors 1016 can also be connected to the peripherals interface 1006, such as a positioning system (e.g., GPS receiver), a temperature sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the wireless communication subsystems 1024 can depend on the communication network(s) over which a mobile device is intended to operate. For example, a mobile device including the illustrated device architecture 1000 can include wireless communication subsystems 1024 designed to operate over a GSM network, a CDMA network, an LTE network, a Wi-Fi network, a Bluetooth network, or any other wireless network. In particular, the wireless communication subsystems 1024 can provide a communications mechanism over which a media playback application can retrieve resources from a remote media server or scheduled events from a remote calendar or event server.

An audio subsystem 1026 can be coupled to a speaker 1028 and a microphone 1030 to facilitate voice-enabled functions, such as voice recognition, voice replication, digital recording, and telephony functions. In smart media devices described herein, the audio subsystem 1026 can be a high-quality audio system including support for virtual surround sound.

The I/O subsystem 1040 can include a touchscreen controller 1042 and/or other input controller(s) 1045. For computing devices including a display device, the touchscreen controller 1042 can be coupled to a touch sensitive display system 1046 (e.g., touchscreen). The touch sensitive display system 1046 and touchscreen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment, the display controller 1043 can provide frame data to the touch sensitive display system 1046 at a variable frame rate.

In one embodiment, a sensor controller 1044 is included to monitor, control, and/or processes data received from one or more of the motion sensor 1010, light sensor 1012, proximity sensor 1014, or other sensors 1016. The sensor controller 1044 can include logic to interpret sensor data to determine the occurrence of one of more motion events or activities by analysis of the sensor data from the sensors.

In one embodiment, the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or navigation instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identity (IMEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

Figure 11:
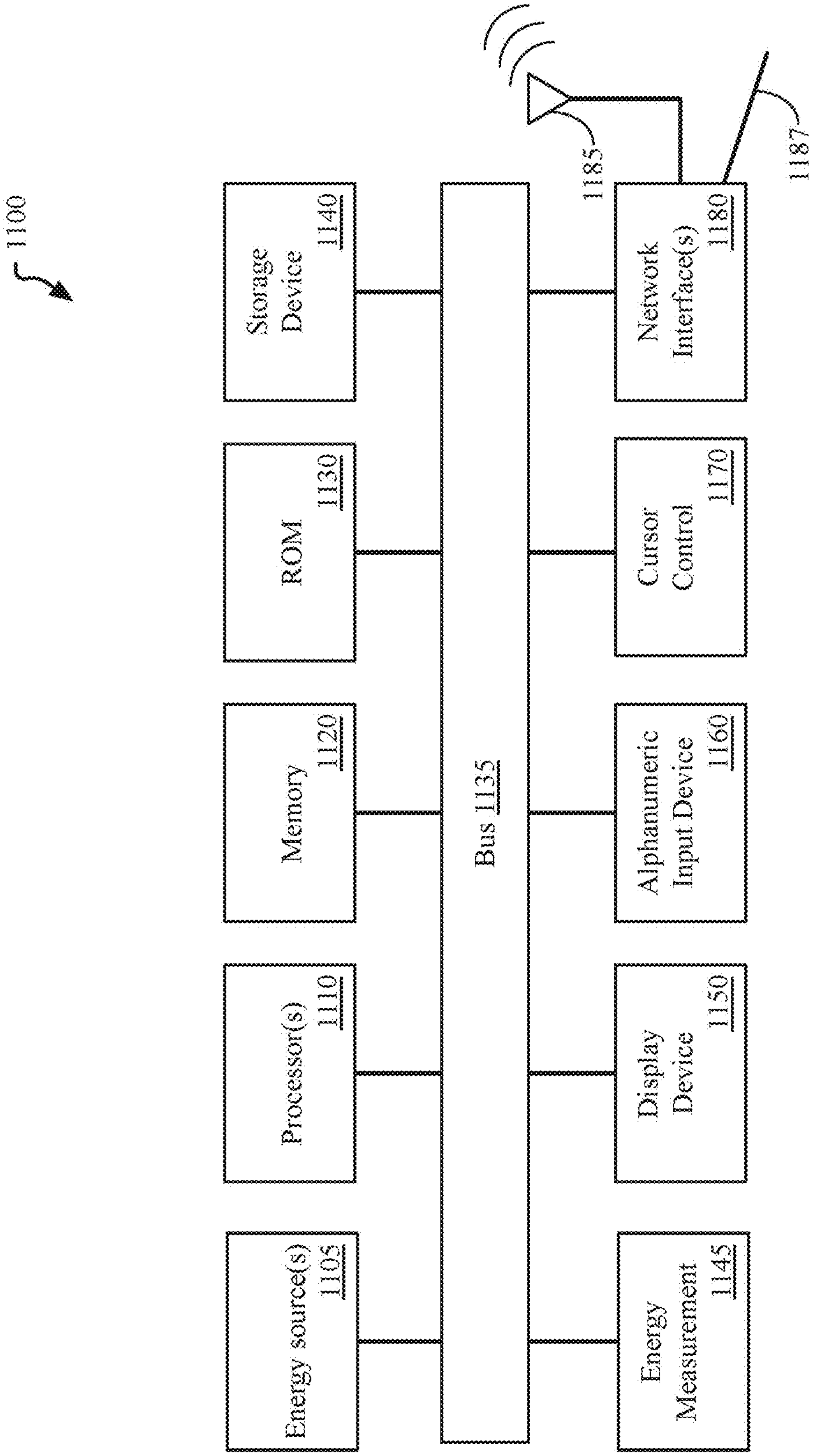
FIG. 11 is a block diagram of a computing system, according to an embodiment.

FIG. 11 is a block diagram of a computing system 1100, according to an embodiment. The illustrated computing system 1100 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1100 can be used to provide the computing device and/or a server device to which the computing device may connect.

The computing system 1100 includes bus 1135 or other communication device to communicate information, and processor(s) 1110 coupled to bus 1135 that may process information. While the computing system 1100 is illustrated with a single processor, the computing system 1100 may include multiple processors and/or co-processors. The computing system 1100 further may include memory 1120 in the form of random-access memory (RAM) or other dynamic storage device coupled to the bus 1135. The memory 1120 may store information and instructions that may be executed by processor(s) 1110. The memory 1120 may also be main memory that is used to store temporary variables or other intermediate information during execution of instructions by the processor(s) 1110.

The computing system 1100 may also include read only memory (ROM) 1130 and/or another data storage device 1140 coupled to the bus 1135 that may store information and instructions for the processor(s) 1110. The data storage device 1140 can be or include a variety of storage devices, such as a flash memory device, a magnetic disk, or an optical disc and may be coupled to computing system 1100 via the bus 1135 or via a remote peripheral interface.

The computing system 1100 may also be coupled, via the bus 1135, to a display device 1150 to display information to a user. The computing system 1100 can also include an alphanumeric input device 1160, including alphanumeric and other keys, which may be coupled to bus 1135 to communicate information and command selections to processor(s) 1110. Another type of user input device includes a cursor control 1170 device, such as a touchpad, a mouse, a trackball, or cursor direction keys to communicate direction information and command selections to processor(s) 1110 and to control cursor movement on the display device 1150. The computing system 1100 may also receive user input from a remote device that is communicatively coupled via one or more network interface(s) 1180.

The computing system 1100 further may include one or more network interface(s) 1180 to provide access to a network, such as a local area network. The network interface(s) 1180 may include, for example, a wireless network interface having antenna 1185, which may represent one or more antenna (e). The computing system 1100 can include multiple wireless network interfaces such as a combination of Wi-Fi, Bluetooth®, near field communication (NFC), and/or cellular telephony interfaces. The network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, the network interface(s) 1180 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1100 can further include one or more energy sources 1105 and one or more energy measurement systems 1145. Energy sources 1105 can include an AC/DC adapter coupled to an external power source, one or more batteries, one or more charge storage devices, a USB charger, or other energy source. Energy measurement systems include at least one voltage or amperage measuring device that can measure energy consumed by the computing system 1100 during a predetermined period of time. Additionally, one or more energy measurement systems can be included that measure, e.g., energy consumed by a display device, cooling subsystem, Wi-Fi subsystem, or other frequently used or high-energy consumption subsystem.

Reference herein to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow can be performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

As described above, one aspect of the present technology is the gathering and use of data available from specific and legitimate sources to enable account creation on behalf of other users and to enable management of a satellite device of another user. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out"

of participation in the collection of personal information data during registration for services. In another example, users can select not to provide location information for targeted content delivery services. In yet another example, users can select to not provide precise location information, but permit the transfer of location zone information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, any private data that is to be transmitted to a server can be subject to privacy preserving transformations to mask the source of that data.

The terminology used herein is for the purpose of describing particular embodiments only and is not intended to be limiting as to all embodiments. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, California.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide a system and method of synchronization of context data between networked electronic devices and scheduling tasks based on remote context. A first device can transmit a predicate to a second device, where the predicate includes a condition associated with an attribute of a multi-device context store. Upon the occurrence of the condition at the second device, a notification and/or context update can be sent by the second device to the first device. The predicate can also include a code block to be executed upon the occurrence of the condition.

One embodiment provides for a non-transitory machine-readable medium storing instructions to cause one or more processors to perform operations comprising constructing a predicate on a first electronic device, wherein the predicate includes a condition associated with an attribute of a multi-device context store, transmitting the predicate to a second electronic device, receiving a notice from the second electronic device that the condition was satisfied, and performing an action on the first electronic device in response to the notice.

One embodiment provides for a method comprising, on an electronic device including one or more processors, receiving a predicate from a remote device, wherein the predicate includes a predicate condition associated with an attribute of a multi-device context store, storing a code block of the predicate in a code block database creating a registration for the predicate that references the predicate condition and code block to conditionally execute upon occurrence of the predicate condition, monitoring the multi-device context store for a change to an attribute, in response to detecting a change to the attribute, evaluating the change relative to the registration for the predicate, and executing a code block when the predicate condition evaluates to true based on the change to the attribute.

Using the techniques described above, a data processing system can be configured that includes a camera device, a network interface, memory to store instructions, and one or more processors to execute the instructions. The instructions cause the one or more processors to begin upload of a set of photos via the network interface, the set of photos captured via the camera device, wherein the set of photos are to be uploaded to a remote photo library, send a predicate to a remote device, wherein the predicate includes a condition to trigger when a photo application with access to the remote photo library is launched or becomes a foreground application, pause the upload of the set of photos before completion of the upload, receive a notice from the remote device that the predicate has been triggered, and resume the upload of the set of photos in response to the notice. In one embodiment, the instructions further cause the one or more processors to set a processor of the one or more processors to a low-power state and wake the processor from the low-power state in response to receipt of the notice. The processor can then resume the upload of the set of photos.

Using the techniques described above, an electronic device can be configured that includes memory to store instructions and one or more processors to execute the instructions. The instructions cause the one or more processors to begin playback of a media item, send a predicate to a mobile electronic device configured to receive incoming calls, the predicate to trigger upon receipt of an incoming call at the mobile electronic device, receive a notice from the mobile electronic device of an incoming call at the mobile electronic device, and pause playback of the media item in response to the notice. In one embodiment the instructions cause the one or more processors to send the predicate to a mobile electronic device in response to detection of the mobile electronic device, where the mobile electronic device is detected via a network advertisement. The network advertisement can include a wireless radio advertisement.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A method comprising:

on an electronic device including one or more processors:

receiving a predicate from a remote device, wherein the predicate includes a predicate condition associated with an attribute of a multi-device context store;

storing a code block of the predicate in a code block database creating a registration for the predicate that references the predicate condition and code block to conditionally execute upon occurrence of the predicate condition;

monitoring the multi-device context store for a change to an attribute;

in response to detecting a change to the attribute, evaluating the change relative to the registration for the predicate; and executing a code block when the predicate condition evaluates to true based on the change to the attribute.

2. The method of claim 1, wherein the predicate includes the code block.

3. The method of claim 2, further comprising sending a notification to the remote device that the predicate condition has evaluated to true.

4. The method of claim 2, further comprising sending the change to the attribute to the remote device.

5. The method of claim 1, wherein the predicate further comprises a wake flag that indicates whether the occurrence of the predicate condition causes an application processor of the electronic device to wake from a sleep state to execute the code block or whether the occurrence of the predicate condition causes the code block to be placed in a queue that is executed when the application processor of the electronic device wakes from the sleep state.

6. The method of claim 1, wherein the multi-device context store is locally stored at the electronic device.

7. The method of claim 1, further comprising:

synchronizing the multi-device context store of the electronic device with another instance of the multi-device context store at the remote device.

8. A non-transitory machine-readable medium comprising instructions that, when executed by one or more processors, cause the one or more processors to perform operations comprising:

receiving, by an electronic device, a predicate from a remote device, wherein the predicate includes a predicate condition associated with an attribute of a multi-device context store;

storing a code block of the predicate in a code block database creating a registration for the predicate that references the predicate condition and code block to conditionally execute upon occurrence of the predicate condition;

monitoring the multi-device context store for a change to an attribute;

in response to detecting a change to the attribute, evaluating the change relative to the registration for the predicate; and executing a code block when the predicate condition evaluates to true based on the change to the attribute.

9. The non-transitory machine-readable medium of claim 8, wherein the predicate includes the code block.

10. The non-transitory machine-readable medium of claim 9, wherein the operations further comprise sending a notification to the remote device that the predicate condition has evaluated to true.

11. The non-transitory machine-readable medium of claim 9, wherein the operations further comprise sending the change to the attribute to the remote device.

12. The non-transitory machine-readable medium of claim 8, wherein the predicate further comprises a wake flag that indicates whether the occurrence of the predicate condition causes an application processor of the electronic device to wake from a sleep state to execute the code block or whether the occurrence of the predicate condition causes the code block to be placed in a queue that is executed when the application processor of the electronic device wakes from the sleep state.

13. The non-transitory machine-readable medium of claim 8, wherein the multi-device context store is locally stored at the electronic device.

14. The non-transitory machine-readable medium of claim 8, wherein the operations further comprises:

synchronizing the multi-device context store of the electronic device with another instance of the multi-device context store at the remote device.

15. A device comprising:

a memory; and at least one processor configured to:

receive a predicate from a remote device, wherein the predicate includes a predicate condition associated with an attribute of a multi-device context store;

store a code block of the predicate in a code block database creating a registration for the predicate that references the predicate condition and code block to conditionally execute upon occurrence of the predicate condition;

monitor the multi-device context store for a change to an attribute;

in response to detection of a change to the attribute, evaluate the change relative to the registration for the predicate; and execute a code block when the predicate condition evaluates to true based on the change to the attribute.

16. The device of claim 15, wherein the predicate includes the code block.

17. The device of claim 16, wherein the at least one processor is further configured to send a notification to the remote device that the predicate condition has evaluated to true.

18. The device of claim 16, wherein the at least one processor is further configured to send the change to the attribute to the remote device.

19. The device of claim 15, wherein the predicate further comprises a wake flag that indicates whether the occurrence of the predicate condition causes an application processor of the device to wake from a sleep state to execute the code block or whether the occurrence of the predicate condition causes the code block to be placed in a queue that is executed when the application processor of the device wakes from the sleep state.

20. The device of claim 15, wherein the multi-device context store is locally stored at the device.

* * * * *